US009990678B1

(12) United States Patent
Cabrera et al.

(10) Patent No.: US 9,990,678 B1
(45) Date of Patent: Jun. 5, 2018

(54) SYSTEMS METHODS AND ARTICLES OF MANUFACTURE FOR ASSESSING TRUSTWORTHINESS OF ELECTRONIC TAX RETURN DATA

(71) Applicant: Intuit Inc., Mountain View, CA (US)

(72) Inventors: Luis F. Cabrera, Bellevue, WA (US); Gang Wang, San Diego, CA (US); Kevin M. McCluskey, Carlsbad, CA (US); William T. Laaser, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 374 days.

(21) Appl. No.: 14/675,166

(22) Filed: Mar. 31, 2015

(51) Int. Cl.
*G06Q 40/00* (2012.01)
(52) U.S. Cl.
CPC .......... *G06Q 40/123* (2013.12); *G06Q 40/00* (2013.01)
(58) Field of Classification Search
CPC .............................. G06Q 40/00; G06Q 40/123
See application file for complete search history.

(56) References Cited

U.S. PATENT DOCUMENTS

| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,819,249 A | 10/1998 | Dohanich |

(Continued)

FOREIGN PATENT DOCUMENTS

| JP | 2002-117121 A | 4/2002 |
| JP | 2005-190425 A | 7/2005 |

(Continued)

OTHER PUBLICATIONS

Julie-Anne Cronin, Emily Y. Lin, Laura Power, and Michael Cooper, Distributing the Corporate Income Tax: Revised U.S. Treasury Methodology, May 2012, Department of Treasury, web, 2-31 (Year: 2012).*

(Continued)

*Primary Examiner* — I Jung Liu
(74) *Attorney, Agent, or Firm* — Vista IP Law Group LLP

(57) ABSTRACT

Computer-implemented methods, systems and articles of manufacture for assessing trustworthiness of electronic tax return data. Systems may include modular components including a confidence module that determines at least one attribute of a source of the electronic tax return data, determines a confidence score for the electronic tax return data based at least in part upon at least one source attribute, compares the confidence score and pre-determined criteria, and generates an output indicating whether the confidence score for the electronic tax return data satisfies the pre-determined criteria. When the confidence score does not satisfy the pre-determined criteria, the user can be presented with an alert or message. Confidence scores can be generated and may also be displayed for specific electronic tax return data or fields, a tax form or worksheet, an interview screen, a tax topic, or the tax return as a whole, e.g., for purposes of determining audit risk.

45 Claims, 22 Drawing Sheets

(56) References Cited

U.S. PATENT DOCUMENTS

| | | | |
|---|---|---|---|
| 6,078,898 A | 6/2000 | Davis | |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,690,854 B2 | 2/2004 | Helbing | |
| 6,697,787 B1 | 2/2004 | Miller | |
| 6,898,573 B1 | 5/2005 | Piehl | |
| 6,912,508 B1 | 6/2005 | McCalden | |
| 7,234,103 B1 | 6/2007 | Regan | |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 | 5/2009 | Peak | |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 * | 4/2010 | Burlison | G06Q 40/02 705/36 T |
| 7,716,094 B1 | 5/2010 | Sutter et al. | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,818,222 B2 | 10/2010 | Allanson | |
| 7,849,405 B1 | 12/2010 | Coletta | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 | 4/2011 | Banks | |
| 8,001,006 B1 | 8/2011 | Yu et al. | |
| 8,019,664 B1 | 9/2011 | Tifford et al. | |
| 8,082,144 B1 | 12/2011 | Brown et al. | |
| 8,108,258 B1 | 1/2012 | Slattery | |
| 8,126,820 B1 | 2/2012 | Talan | |
| 8,190,499 B1 | 5/2012 | McVickar | |
| 8,204,805 B2 | 6/2012 | Eftekhari | |
| 8,224,726 B2 * | 7/2012 | Murray | G06Q 40/00 705/40 |
| 8,234,562 B1 | 7/2012 | Evans | |
| 8,244,607 B1 | 8/2012 | Quinn | |
| 8,346,635 B1 | 1/2013 | Olim | |
| 8,346,680 B2 | 1/2013 | Castleman | |
| 8,370,795 B1 | 2/2013 | Sage | |
| 8,386,344 B2 | 2/2013 | Christina | |
| 8,407,113 B1 | 3/2013 | Eftekhari | |
| 8,417,596 B1 | 4/2013 | Dunbar et al. | |
| 8,417,597 B1 | 4/2013 | McVickar | |
| 8,447,667 B1 * | 5/2013 | Dinamani | G06Q 40/025 705/31 |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,583,516 B1 | 11/2013 | Pitt | |
| 8,589,262 B1 | 11/2013 | Gang | |
| 8,607,353 B2 | 12/2013 | Rippert et al. | |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 | 4/2014 | Houseworth | |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 9,372,687 B1 | 6/2016 | Pai | |
| 9,690,854 B2 | 6/2017 | Stent et al. | |
| 9,760,953 B1 | 9/2017 | Wang et al. | |
| 2002/0065831 A1 | 5/2002 | DePaolo | |
| 2002/0107698 A1 | 8/2002 | Brown et al. | |
| 2002/0111888 A1 | 8/2002 | Stanley | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0078271 A1 | 4/2004 | Marano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0172347 A1 | 9/2004 | Barthel | |
| 2004/0205008 A1 | 10/2004 | Haynie et al. | |
| 2005/0171822 A1 | 8/2005 | Cagan | |
| 2005/0216379 A1 | 9/2005 | Ozaki | |
| 2006/0112114 A1 | 5/2006 | Yu | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |
| 2006/0293990 A1 | 12/2006 | Schaub | |
| 2007/0033116 A1 | 2/2007 | Murray | |
| 2007/0033117 A1 | 2/2007 | Murray | |
| 2007/0033130 A1 | 2/2007 | Murray | |
| 2007/0094207 A1 | 4/2007 | Yu | |
| 2007/0136157 A1 | 6/2007 | Neher et al. | |
| 2007/0150387 A1 | 6/2007 | Seubert et al. | |
| 2007/0156564 A1 | 7/2007 | Humphrey et al. | |
| 2007/0179841 A1 | 8/2007 | Agassi | |
| 2007/0250418 A1 | 10/2007 | Banks et al. | |
| 2008/0059900 A1 | 3/2008 | Murray | |
| 2008/0097878 A1 | 4/2008 | Abeles | |
| 2008/0147494 A1 | 6/2008 | Larson | |
| 2008/0162310 A1 | 7/2008 | Quinn | |
| 2008/0177631 A1 | 7/2008 | William | |
| 2008/0215392 A1 | 9/2008 | Rajan | |
| 2008/0243531 A1 | 10/2008 | Hyder et al. | |
| 2009/0024694 A1 | 1/2009 | Fong | |
| 2009/0037305 A1 | 2/2009 | Sander | |
| 2009/0048957 A1 | 2/2009 | Celano | |
| 2009/0117529 A1 | 5/2009 | Goldstein | |
| 2009/0125618 A1 | 5/2009 | Huff | |
| 2009/0138389 A1 | 5/2009 | Barthel | |
| 2009/0150169 A1 | 6/2009 | Kirkwood | |
| 2009/0157572 A1 | 6/2009 | Chidlovskii | |
| 2009/0193389 A1 | 7/2009 | Miller | |
| 2009/0204881 A1 | 8/2009 | Murthy | |
| 2009/0239650 A1 | 9/2009 | Alderucci et al. | |
| 2009/0248594 A1 | 10/2009 | Castleman | |
| 2009/0248603 A1 | 10/2009 | Kiersky | |
| 2010/0036760 A1 | 2/2010 | Abeles | |
| 2010/0131394 A1 | 5/2010 | Rutsch | |
| 2010/0153138 A1 | 6/2010 | Evans | |
| 2011/0004537 A1 | 1/2011 | Allanson et al. | |
| 2011/0078062 A1 | 3/2011 | Kleyman | |
| 2011/0145112 A1 | 6/2011 | Abeles | |
| 2011/0225220 A1 | 9/2011 | Huang et al. | |
| 2011/0258610 A1 | 10/2011 | Aaraj et al. | |
| 2011/0264569 A1 | 10/2011 | Houseworth | |
| 2012/0016817 A1 | 1/2012 | Smith et al. | |
| 2012/0027246 A1 | 2/2012 | Tifford | |
| 2012/0030076 A1 | 2/2012 | Checco et al. | |
| 2012/0030577 A1 | 2/2012 | Akolkar et al. | |
| 2012/0072321 A1 | 3/2012 | Christian et al. | |
| 2012/0109792 A1 | 5/2012 | Eftekhari | |
| 2012/0109793 A1 | 5/2012 | Abeles | |
| 2012/0136764 A1 | 5/2012 | Miller | |
| 2012/0278365 A1 | 11/2012 | Labat et al. | |
| 2013/0036347 A1 | 2/2013 | Eftekhari | |
| 2013/0080302 A1 | 3/2013 | Allanson | |
| 2013/0097262 A1 | 4/2013 | Dandison | |

(56) References Cited

U.S. PATENT DOCUMENTS

| | | | |
|---|---|---|---|
| 2013/0111032 | A1 | 5/2013 | Alapati et al. |
| 2013/0138586 | A1 | 5/2013 | Jung et al. |
| 2013/0185347 | A1 | 7/2013 | Romano |
| 2013/0198047 | A1 | 8/2013 | Houseworth |
| 2013/0218735 | A1 | 8/2013 | Murray |
| 2013/0262279 | A1 | 10/2013 | Finley et al. |
| 2013/0282539 | A1 | 10/2013 | Murray |
| 2013/0290169 | A1 | 10/2013 | Bathula |
| 2014/0108213 | A1 | 4/2014 | Houseworth |
| 2014/0172656 | A1 | 6/2014 | Shaw |
| 2014/0201045 | A1 | 7/2014 | Pai et al. |
| 2014/0207633 | A1 | 7/2014 | Aldrich et al. |
| 2014/0241631 | A1 | 8/2014 | Huang |
| 2014/0244455 | A1 | 8/2014 | Huang |
| 2014/0244457 | A1* | 8/2014 | Howell ............. G06Q 40/10 705/31 |
| 2014/0337189 | A1 | 11/2014 | Barsade |
| 2015/0142703 | A1 | 5/2015 | Rajesh |
| 2015/0237205 | A1 | 8/2015 | Waller et al. |
| 2015/0254623 | A1 | 9/2015 | Velez et al. |
| 2015/0269491 | A1 | 9/2015 | Tripathi et al. |
| 2016/0027127 | A1 | 1/2016 | Chavarria et al. |
| 2016/0063645 | A1 | 3/2016 | Houseworth et al. |
| 2016/0078567 | A1 | 3/2016 | Goldman et al. |
| 2016/0092993 | A1 | 3/2016 | Ciaramitaro |
| 2016/0092994 | A1 | 3/2016 | Roebuck et al. |
| 2016/0098804 | A1 | 4/2016 | Mascaro et al. |
| 2016/0148321 | A1 | 5/2016 | Ciaramitaro et al. |
| 2016/0275627 | A1 | 9/2016 | Wang |
| 2017/0004583 | A1 | 1/2017 | Wang |
| 2017/0004584 | A1 | 1/2017 | Wang |
| 2017/0032468 | A1 | 2/2017 | Wang |

FOREIGN PATENT DOCUMENTS

| | | |
|---|---|---|
| JP | 2014-206960 A | 10/2014 |
| KR | 10-2012-0011987 A | 2/2012 |

OTHER PUBLICATIONS

Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Notice of Allowance and Fee(s) Due dated May 5, 2017 in U.S. Appl. No. 14/206,682 (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports—graphs-and-snap-shots/track-the-earnings—taxes—deductions—or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.

(56) References Cited

OTHER PUBLICATIONS

Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Final Office Action dated Jun. 6, 2017 in U.S. Appl. No. 14/462,411 (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).

(56) References Cited

OTHER PUBLICATIONS

Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Sep. 14, 2017 in U.S. Appl. No. 14/530,159, (41pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Vanderbilt University, "Free tax prep help available for Vanderbilt employees", Feb. 6, 2014, Vanderbilt University, p. 1-3 [NPL-1].
Office Action dated Sep. 28, 2017 in U.S. Appl. No. 14/701,149, (71pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).

* cited by examiner

|  | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 6A

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 6B

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | Y | ? | Y | Yes |
| R4 | N | Y | ? | N | N | N | ? | Yes |
| R5 | N | N | ? | ? | ? | N | ? | Yes |

Columns (Questions 462)

(Rows) (Rules 461)

Cross Out Since Answer to Question A is "yes" 1010

```
Interview Screen / Form / Worksheet
232

Field 1 ⁓ 1102a
    ┌─────────────┬──────┐
    │ Data 251a   │ 98%  │
    └─────────────┴──────┘

Field 2 ⁓ 1102b
    ┌─────────────┬──────┐                    ⁓ 902
    │ Data 251a   │ 95%  │
    └─────────────┴──────┘            ╱────────────────╲
                                     │ Please check the data in │
    Field 3 ⁓ 1102c                  │ Field 3. Thanks!         │
    ┌─────────────┬──────┐            ╲────────────────╱
    │ Data 251a   │ 48%  │
    └─────────────┴──────┘

Field 4 ⁓ 1102d
    ┌─────────────┬──────┐
    │             │      │
    └─────────────┴──────┘

Field 5 ⁓ 1102e
    ┌─────────────┬──────┐
    │             │      │
    └─────────────┴──────┘

Field 6 ⁓ 1102f
    ┌─────────────┬──────┐
    │ Data 251f   │ 60%  │
    └─────────────┴──────┘

Field 7 ⁓ 1102g
    ┌─────────────┬──────┐
    │ Data 251g   │ 70%  │
    └─────────────┴──────┘
```

FIG. 14

SYSTEMS METHODS AND ARTICLES OF MANUFACTURE FOR ASSESSING TRUSTWORTHINESS OF ELECTRONIC TAX RETURN DATA

SUMMARY

Embodiments are related to assessing the trustworthiness of, or confidence in, electronic tax return data.

Embodiments are also related to assessing the trustworthiness of, or confidence in, electronic tax return data within a modular tax return preparation system in which tax logic is independent of or loosely coupled to user interface (UI) functions.

Certain embodiments are related to a trustworthiness or confidence analysis engine that is used to score or rank electronic tax return data based on one or more attributes of the source of electronic tax return data. Scored or ranked electronic tax return data that does not satisfy pre-determined or minimum trustworthiness criteria are identified for an alert or message that is presented to the user. A confidence score determined for electronic tax return data may be based on analysis of a single source attribute or based on a combination of source attributes, in which case a multi-factor or weighting function or algorithm may be utilized to determine a composite score or score for electronic tax return data that takes into account different types and numbers of source attributes.

Certain embodiments are related to marking, labeling or tagging electronic tax return data for use or consideration by other system components. For example, a tag determined by one modular component may be read by another component when executing a calculation, and read by another component when determining candidate topics or questions that may be presented to the user via an interview screen.

Certain embodiments are also related to analyzing the trustworthiness of or confidence in electronic tax return data for determining whether the user of a tax return preparation application should be alerted regarding the possibility of an audit.

Certain embodiments are also related to trustworthiness or confidence score propagation to assess confidence of different sections of an electronic tax return. For example, confidence scores determined for electronic tax return data can be used to determine a confidence score for a tax topic, and respective confidence scores for respective tax topics can be used to determine a confidence score for an electronic tax return as a whole. As another example, confidence scores for electronic tax return data can be used to determine a confidence score for a tax form or worksheet, and respective confidence scores for respective tax forms or worksheets can be used to determine a confidence score for an electronic tax return as a whole.

Certain embodiments are related to displaying confidence scores to a user during preparation of an electronic tax return. Thus, as data is entered, imported or received, a determined confidence score for that data or field can be displayed adjacent to the data or field, and related confidence determinations for different topics or tax forms or worksheets may also be displayed. Confidence scores for a topic or tax form may be concurrently displayed with confidence scores for the underlying electronic tax return data or fields. For example, an embodiment may involve a confidence score for "Personal Information" and separate confidence scores for each field that has been populated with personal information data, whereas a confidence score may be determined for "Income" and separate confidence scores of reach field that has been populated with income data. Similar confidence scores and field scores may be determined for particular tax forms or interview screens, such as tax forms or interview screens for Form W-2, K-1 or 1099. Thus, there may be a confidence score for Form W-2, and confidence scores for each field of an interview screen for Form W-2 that has been populated with data. As the user navigates different interview screens or forms or worksheets during a form view, the user can be presented with respective confidence scores for different documents or topics of an electronic tax return. As a refund amount changes as electronic tax return data changes, confidence scores can also be updated.

One embodiment is related to a tax return preparation system that includes a UI controller, a tax logic agent, a data store and a confidence or trustworthiness analysis module or engine. The UI controller and the tax logic agent are in communication with each other, but are independent of or loosely coupled to each other, such that the tax logic agent may generate suggestions or hits about topics or questions that may be presented to the user, but these identified questions or topics are "non-binding" suggestions or hints. In this regard, the UI controller can consider the non-binding suggestions generated by the tax logic agent, but is not controlled by the tax logic agent and can process non-binding suggestions independently of the tax logic agent. Thus, the UI controller and the tax logic agent are loosely coupled to each other, yet independent of each other and operate in a separate or modular manner as a result of separation of tax logic or tax rules and UI functions. The tax logic agent and the UI controller share the data store. The UI controller can write electronic tax return data to the data store including data entered manually or received or imported from a source. The tax logic agent can read the runtime data stored in the data store and provide non-binding suggestions to the UI controller. The confidence analysis engine or module is configured or programmed to determine at least one attribute of a source of the electronic tax return data, determine a confidence score for the electronic tax return data or field populated thereby based at least in part upon at least one source attribute, compare the confidence score and pre-determined criteria, and generate an output or result indicating whether the confidence score for the electronic tax return data satisfies the pre-determined criteria. When the confidence score does not satisfy the pre-determined criteria (indicating unsatisfactory or low confidence in the data), the UI controller is configured or programmed to generate an alert or message involving the electronic tax return data and present the alert or message to the user.

Yet other embodiments involve non-transitory computer-readable medium or articles of manufacture comprising instructions, which when executed by a processor of a computing device or by respective computers which may be connected via respective networks, causes the computing device(s) to execute processes for assessing the trustworthiness of or confidence in electronic tax return data.

Given the modular nature of embodiments, one or more or all of the UI controller, tax logic agent, shared data store and calculation engine can be on different computing devices and in communication with the shared data store through respective networks such that tax logic, user interface and calculation instructions are executed in a distributed computing environment.

Other embodiments are directed to computer-implemented methods for assessing the trustworthiness of or confidence in electronic tax return data based at least in part upon determining confidence scores that consider one or more attributes of electronic tax return data sources. For example, one embodiment of a method comprises a confidence analysis engine or module determining an attribute of a source of the electronic tax return data, determining a confidence score for the electronic tax return data based at least in part upon at least one source attribute, comparing the confidence score and pre-determined criteria, and generating an output indicating whether the confidence score for the electronic tax return data satisfies the pre-determined criteria. When the confidence score does not satisfy the pre-determined criteria, the UI controller is configured or programmed to generate an alert or message involving the electronic tax return data and present the alert or message to the user.

In a single or multiple embodiments, the confidence analysis module is a component of or utilized by the tax logic agent that generates a non-binding suggestion for a UI controller. In such embodiments, the tax logic agent generates a non-binding suggestion based at least in part upon an output or result generated by the confidence analysis module, and the non-binding suggestion is provided to the UI controller for consideration and processing to alert or message the user regarding low confidence electronic tax return data or data failing to satisfy pre-determined criteria.

In a single or multiple embodiments, the confidence analysis module is a component or utilized by the UI controller, which generates the alert or independently of a non-binding suggestion generated by the tax logic agent. For example, as data is received by the UI controller, the UI controller may alert or generate a message to the user about low confidence data or data failing to satisfy pre-determined criteria. According to one embodiment, the confidence analysis is performed before the electronic tax return data is written to the data store by the user interface controller.

In other embodiments, each of the tax logic agent and the UI controller includes or utilizes a confidence analysis module such that the UI controller may make confidence assessments and receive non-binding suggestions from the tax logic agent regarding confidence assessments. A non-binding suggestion may suggest to the UI controller to perform or repeat a confidence analysis on certain data or to confirm that a tag or status or confidence conclusion for that data has not changed. For example, the tax logic agent may identify certain unanswered questions that could be presented to the user based on the analysis of decision or rule tables, but such determination is based on electronic tax return data read from the shared data store that was tagged by the UI controller as being associated with a low confidence score or such data has yet to be confirmed or corrected by the user.

In a single or multiple embodiments, the confidence analysis module is configured or programmed to tag or label electronic tax return data that is the subject of an output or result generated by the confidence analysis module, and the UI controller can write the electronic tax return to the data store with the associated tag, label or indicator. Stored electronic tax return data may include one or multiple tags or indicators, e.g., for multiple source attributes or status regarding notification and review by the user. Tags may involve confidence scores and/or source attributes. For example, electronic tax return data can be tagged to indicate a confidence score or whether a confidence score associated with the electronic transaction data satisfied the pre-determined score criteria, whether the user has been presented with, or has confirmed or corrected, electronic transaction data associated with a confidence score that failed to satisfy the pre-determined criteria. Tags may also involve or indicate a source attribute.

In a single or multiple embodiments, the system also includes a calculation engine configured or programmed to read electronic tax return data from the data store, determine the tag associated with the electronic tax return data, execute a calculation involving the electronic tax return data, determine a calculation result, and write the calculation result to the shared data store together with the associated tag such that the electronic tax return data and the calculation result include the same tag. The calculation engine may request user confirmation or correction of electronic tax return data associated with a low or unacceptable confidence score as determined from one or more tags before executing a calculation involving the tagged electronic tax return. A result generated by a calculation engine can also be tagged by the calculation engine or confidence analysis module thereof or utilized thereby such that when the calculation engine reads the runtime data at a later time, or when the tax logic agent reads the runtime data, these components know that the tax return data or result was a product of tagged electronic tax return data, e.g., these components may know that a result was a product of electronic tax return data associated with a low confidence score.

In a single or multiple embodiments, electronic tax return data includes multiple tags or labels, which may involve one or more of a source attribute, a confidence score and whether a user has been notified or corrected or confirmed data of certain tags. A confidence score is based at least in part upon these one or more source attributes. Source attribute data may include data that identifies a source (such as source name, location, type or category), a format or protocol of electronic data received from the source (such as whether the received data is a pre-determined format or protocol such as Open Financial Exchange (OFS) data format, a format of an electronic tax return such as .tax format, and .pdf format or a format of an output of a recognition process. Source attribute data may also include a score or result generated by a recognition process such as OCR or voice recognition process. Source attribute data may also indicate how electronic tax return data was communicated or received by the UI controller, e.g., whether electronic tax return data was received by electronic transfer or import from an electronic file, from a prior year tax return, or whether the data was manually entered by the user.

In a single or multiple embodiments, the confidence analysis module is configured or programmed to determine at least two attributes of the source of the electronic tax return data, determine a confidence score for the electronic transaction data based at least in part upon the at least two source attributes or that considers multiple source attributes or factors. Thus, embodiments may involve a confidence score that is based on a single source attribute or a confidence score based on multiple source attributes, e.g., as determined by a weighting function and values associated with respective source attributes. Weighting function inputs may include one or more of identification data of the source of the electronic tax return data; a format or protocol of the electronic tax return data; an output generated by the recognition process utilized to determine the electronic tax data; and a communication method utilized to provide the electronic transaction data to the user interface controller.

In a single or multiple embodiments, respective confidence scores generated for respective electronic transaction data based on one or more source attributes are utilized or propagated to determine a confidence score for a tax form or document or a tax topic that may involve fields in different tax forms or documents or interview screens. Thus, respective confidence scores for electronic tax return data may be provided as inputs into a weighting function for topics, which generates a result or output of a confidence score for a tax topic (such as "Income," "Deductions," and "Personal Information"). Similarly, confidence scores for electronic tax return data may be provided as inputs into a weighting function for forms or worksheets, which generates a result or output of a confidence score for tax form or worksheet. As another example, respective scores for respective topics and/or tax forms or worksheets can be provided as inputs into a weighting function to determine a confidence score for the electronic tax return as a whole. Thus, confidence scores determined for electronic tax return data may be used to determine confidence scores for topics and/or forms or worksheets, one or both of which may be used to determine whether the user should be alerted regarding a possible audit in the event that a confidence score for the electronic tax return as a whole fails to satisfy pre-determined criteria for the electronic tax return as a whole.

BRIEF DESCRIPTION OF THE DRAWINGS

FIG. 6A illustrates a decision table based on or derived from a completeness graph of FIG. 5C, FIG. 6B illustrates another embodiment of a decision table that incorporates statistical data that may be used for determining a likelihood or probability of an answer to a question of the decision table according to embodiments, and FIG. 6C illustrates an example of how a rule engine may process a decision table when determining which question to select;

FIG. 14 illustrates one example of how embodiments may be utilize to provide a user of a tax return preparation system with detailed confidence analysis on a field-by-field basis, such as within an interview screen generated by a user interface controller or a particular tax form or worksheet, and how a user may be alerted regarding low confidence electronic tax return data or electronic tax return data that did not satisfy pre-determined criteria;

DETAILED DESCRIPTION OF ILLUSTRATED EMBODIMENTS

Figure 1:
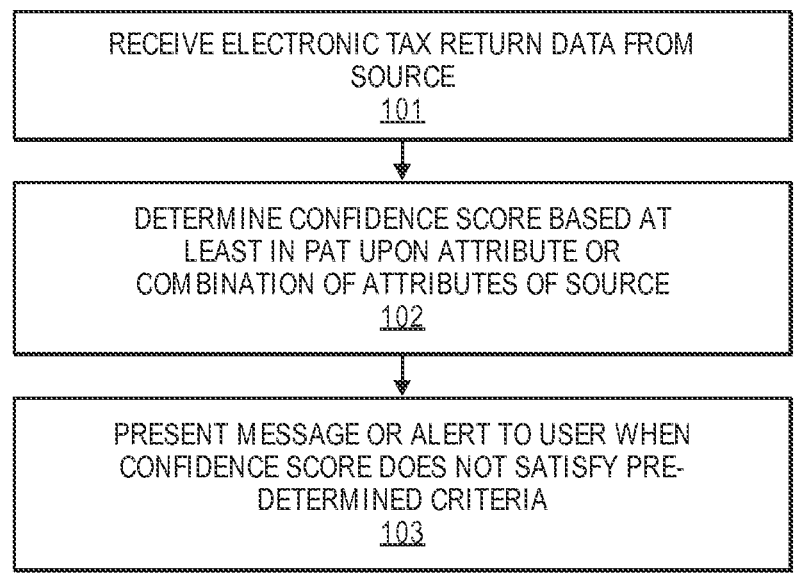
FIG. 1 is a flow diagram of one embodiment of a computer-implemented method for alerting a user of a tax return preparation system regarding confidence in or trustworthiness of electronic tax return data.

Embodiments involve computerized systems, computer-implemented methods, and articles of manufacture or computer program products for determining the trustworthiness of or confidence in electronic tax return data.

Embodiments utilize a new confidence module or engine that is not a component of known tax return preparation applications and that performs a confidence or trustworthiness analysis of electronic tax return data based at least in part upon an attribute or a combination of attributes of a source of data. Depending on the resulting confidence scores or ranking of data and associated scores, a user can be alerted regarding data that is determined to have a low trustworthiness or confidence level or a low ranking so that the user can correct or confirm the data. In this manner, electronic tax return data and associated determinations and calculations are performed with data that is determined to be trustworthy and allows different components or modules to know that certain determinations and calculations are based at least in part upon less trustworthy data such that these determinations can be revisited or resolved later. Thus, embodiments not only provide improved tax return preparation applications, but also provide improvements in audit risk assessment. For these purposes, embodiments also involve making trustworthiness or confidence determinations for particular electronic tax return data or fields, and using or propagating those determinations to make trustworthiness or confidence determinations for a tax topic, interview screen tax form or worksheet, and for the electronic tax return as a whole (e.g., for determining audit risks).

Embodiments also involve circulation confidence related tags or data to various modular components of a tax return preparation system, which may involve communication of tags or data through respective networks to different computing devices on which respective modular components execute. Thus, when trustworthiness and confidence determinations are made, associated data can be stored to a common or shared data store with associated confidence related tags or labels such that tags or labels can be circulated among or read by various components such that when these components perform their respective processing while knowing the confidence indicators and the trustworthiness of corresponding results or determinations made using that data.

For example, the confidence analysis may involve a source attribute of source identification, which may involve a name, category or location of a source. Confidence analysis may also involve a source attribute of the format of the data, such as a whether the data is in a .pdf file, a word processing or spreadsheet document, an electronic format utilized by financial institutions (e.g., .OFX), an electronic format utilized by a tax authority, or an electronic format utilized by a tax return preparation application such as TURBO TAX tax return preparation application. Confidence analysis may also involve a source attribute in the form of a communication method, e.g., whether the data was manually entered by a user, transmitted from a local computer or local file, e.g., an electronic tax return file of a prior tax year, or transmitted from a remote computer through a network. Confidence analysis may also involve an output, score or ranking data generated by a recognition system such as an optical character recognition (OCR) system or speech recognition system. Confidence analysis may also involve a combination of these confidence factors, and different factors may be emphasized more than others via a weighting function or algorithm. Further aspects of embodiments are described with reference to FIGS. 1-17.

Referring to FIG. 1, a computer-implemented method performed according to one embodiment, at 101, a special purpose confidence analysis module receives electronic tax return data from a source, and at 102, determines a confidence score based at least in part upon an attribute, or combination of attributes, of the source. At 103, a message or alert is presented through an interview screen generated or selected by user interface component of the tax return preparation system to the user when the confidence analysis module or engine determines that confidence score does not satisfy pre-determined criteria. Determining a confidence score may involve the confidence analysis module or engine determining inputs for a weighting function or confidence algorithm based at least in part upon one or more attributes of the electronic transaction data source, and executing the weighting function/confidence algorithm to determine the confidence score, which is compared with pre-determined criteria such as a pre-determined minimum score or acceptable range of scores to determine whether an alert is necessary.

Figure 2A:
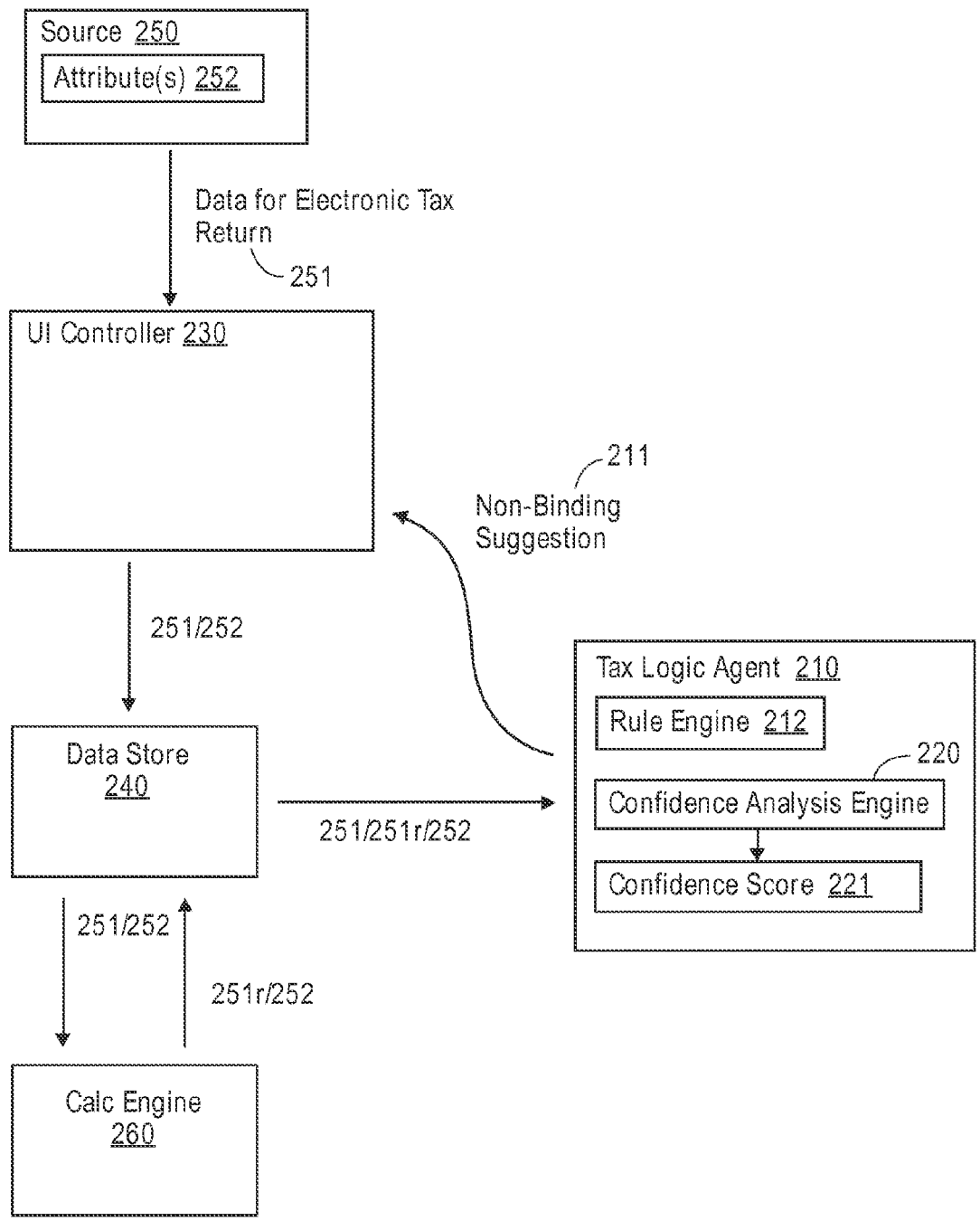
FIG. 2A is a block diagram of one embodiment of a system configured to assess trustworthiness of electronic tax return data utilizing a confidence analysis engine or module that is a component of or utilized by a tax logic agent that generates non-binding suggestions for a user interface controller.

Referring to FIG. 2A, a computerized system 200 of a tax return preparation application constructed according to one embodiment includes or involves a tax logic agent 210, a user interface (UI) controller 230 loosely coupled to the tax logic agent 210, a data store 240 to which the UI controller 220 can write electronic tax return data 251 received from a source 250 and from which the tax logic agent 220 can read electronic tax return data 251. The system 200 also includes a calculation engine 260 that can read electronic tax return data 251 from shared data store 240, perform calculations, and write results 251r ("r" referring to result) back to shared data store 240. In the illustrated embodiment, tax logic agent 210 executes a rule engine 212 that is used to identify candidate questions or topics, which are the subject of a non-binding suggestion 211 that is provided to UI controller 230 for potential processing. UI controller 230, being loosely coupled to and not controlled by tax logic agent 210, determines whether and when to process non-binding suggestion 211 and generate an interview screen including the topic or question of non-binding suggestion 211 when processed. In the illustrated embodiment, tax logic agent 210 includes or utilizes a special purpose confidence analysis module or engine 220 that generates a confidence score 221.

Figure 2B:
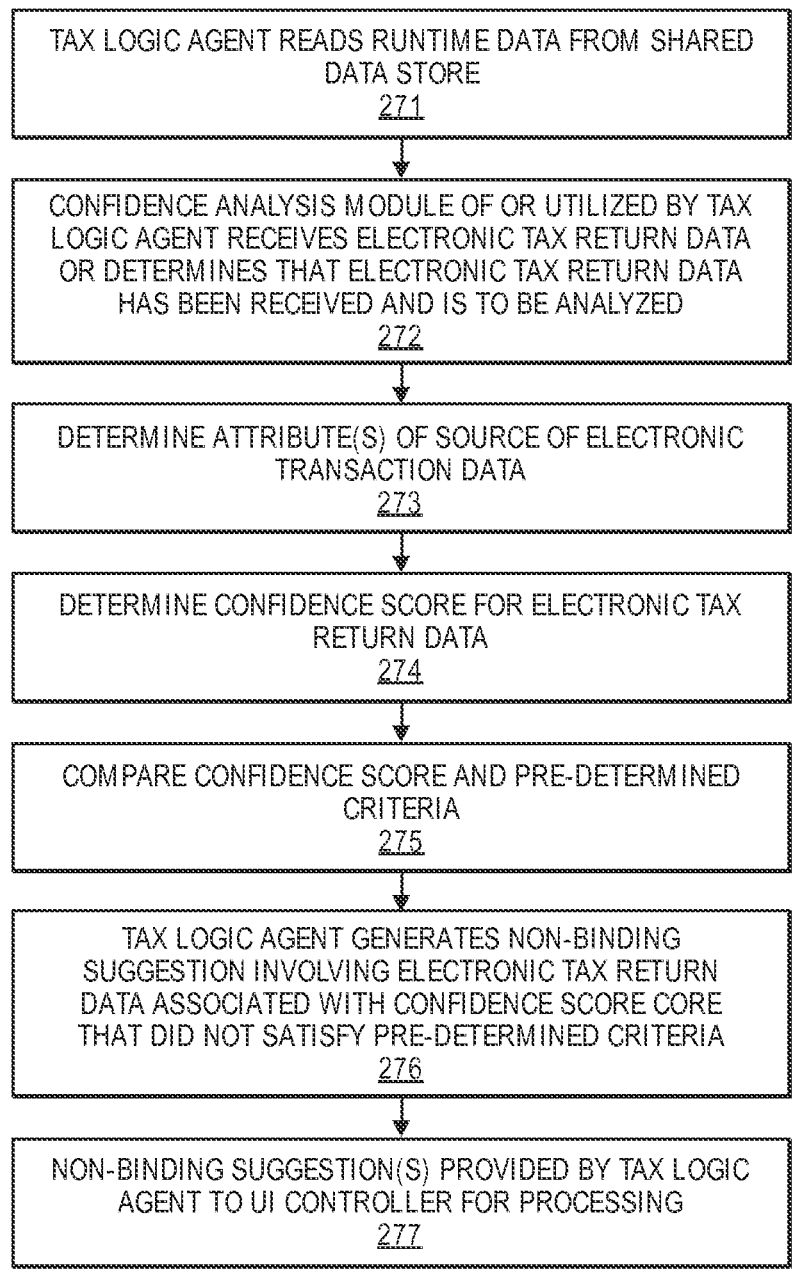
FIG. 2B is a flow diagram of one embodiment of a computer-implemented method for assessing confidence in or trustworthiness of electronic tax return data using a system configured as shown in FIG. 2A.

With continuing reference to FIG. 2B, with the system 200 shown in FIG. 2A, at 271, tax logic agent 210 reads runtime electronic tax return data 251 from shared data store 240, and at 272, special purpose confidence analysis module or engine 220 of or utilized by tax logic agent 210 receives electronic tax return data 251 as read from shared data store 240 or determines that electronic tax return data 251 has been received and is to be analyzed. At 273, confidence analysis module or engine 220 determines attribute(s) 252 of source 250 of electronic tax return data 251. The attributes may be included in a tag or label associated with the electronic tax return data 251 read from the data store 240. At 274, confidence analysis module or engine 220 determines a confidence score 221 for electronic tax return data 251 and at 275, compares confidence score 221 and pre-determined criteria. At 276, tax logic agent 210 generates non-binding suggestion 211 involving electronic tax return data 251 associated with confidence score 221 that did not satisfy pre-determined criteria, and at 277, non-binding suggestion 211 is provided by tax logic agent 210 to UI controller 230 for processing.

Figure 3A:
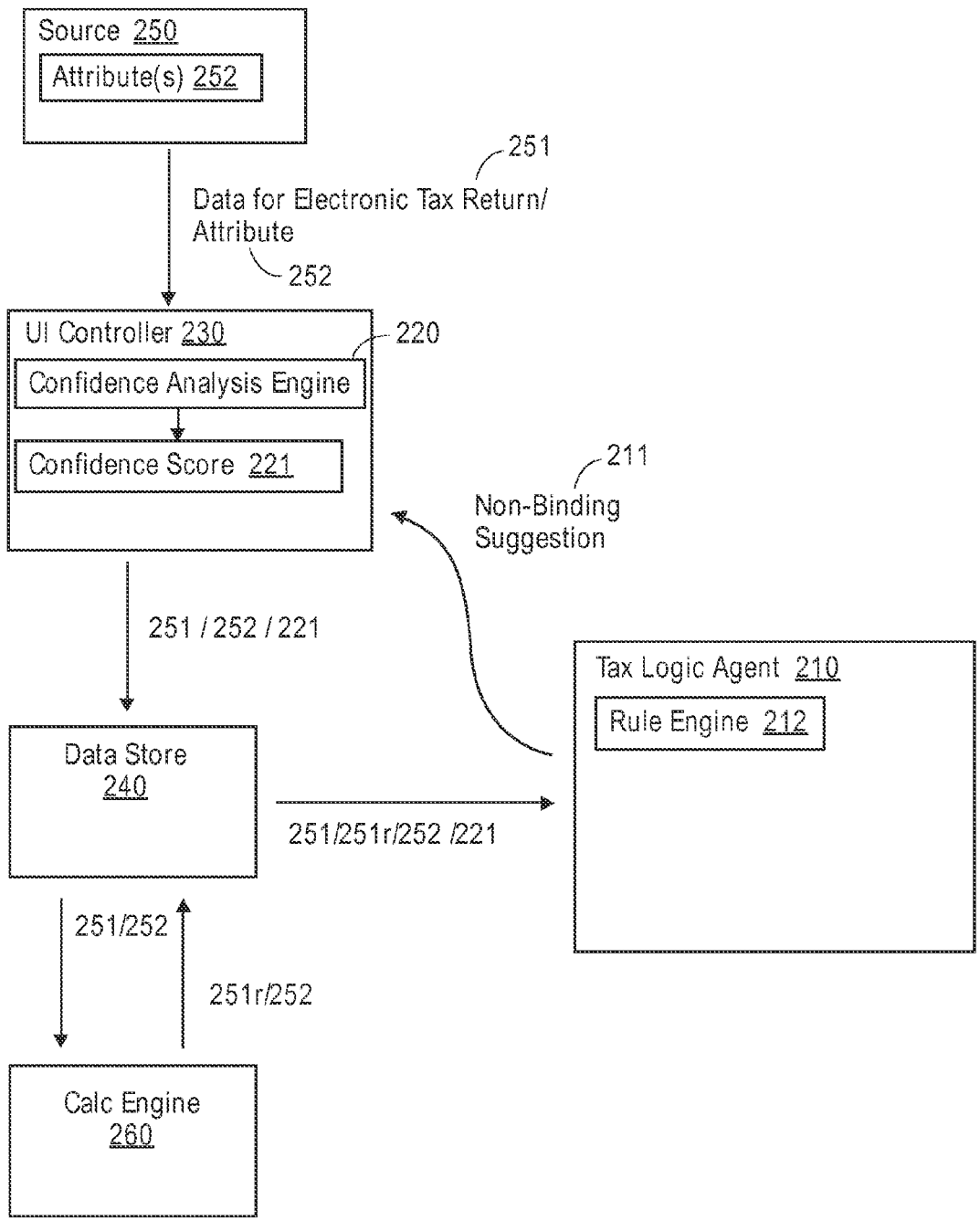
FIG. 3A is a block diagram of one embodiment of a system configured to assess trustworthiness of electronic tax return data utilizing a confidence analysis engine or module that is a component of or utilized by user interface controller.
Figure 3B:
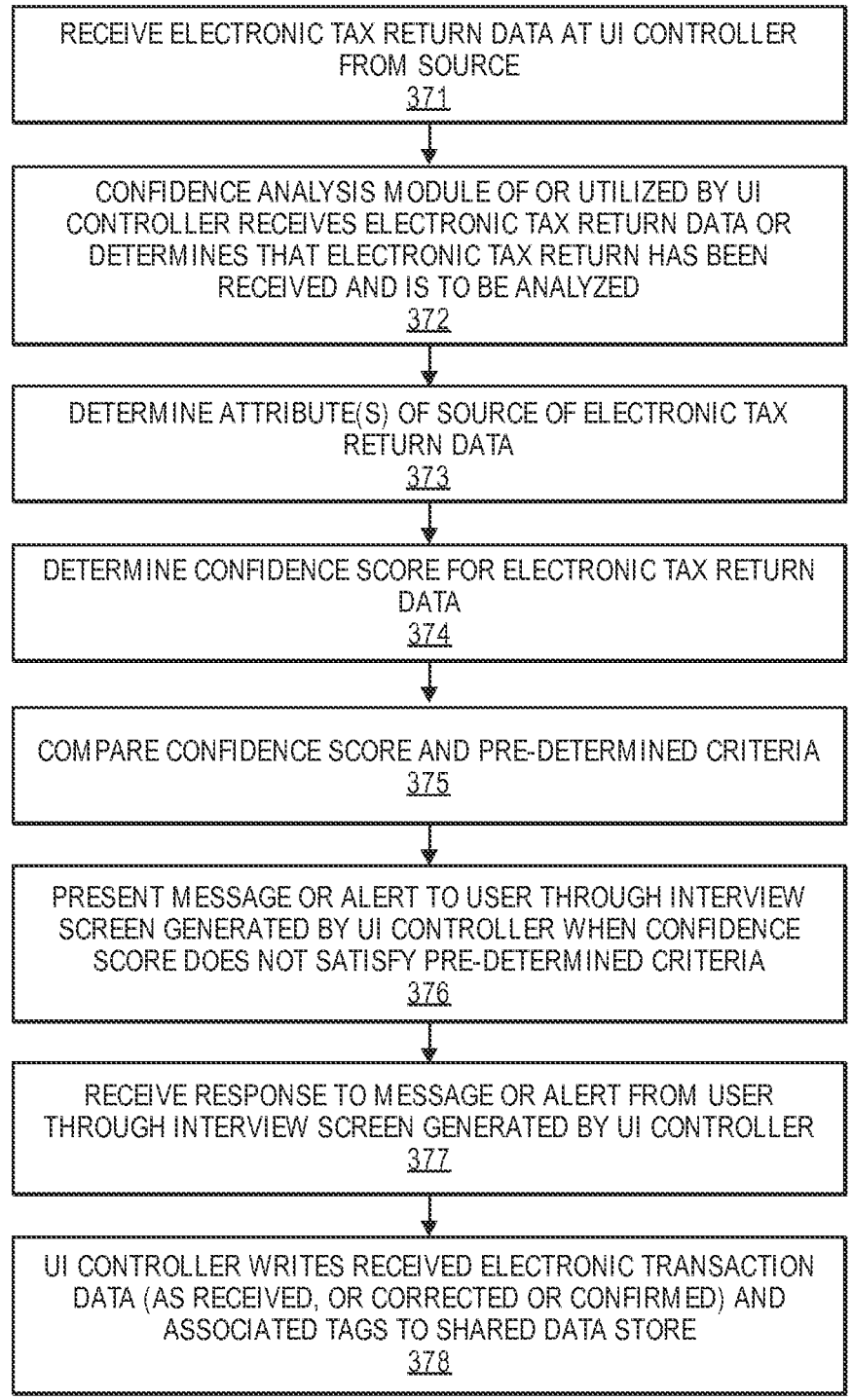
FIG. 3B is a flow diagram of one embodiment of a computer-implemented method for assessing confidence in or trustworthiness of electronic tax return data using a system configured as shown in FIG. 3A.

Referring to FIG. 3A, a computerized system 300 of a tax return preparation application constructed according to one embodiment includes or involves components described above with reference to FIG. 2A, except that confidence analysis module or engine 320 is a component of or utilized by UI controller 330. With further reference to FIG. 3B, at 371, UI controller 330 receives electronic tax return data 351 from source 350, and at 372, confidence analysis module 320 receives electronic tax return data 351 or determines that electronic tax return data 351 has been received and is to be analyzed. At 373, confidence analysis module 320 determines attribute(s) of source 350, and at 374, determines confidence score 321 for electronic tax return data 351. The confidence analysis module 320, at 375, compares determined confidence score 321 and pre-determined criteria. At 376, a message or alert is presented to user through an interview screen generated by UI controller 330 when confidence score 321 does not satisfy pre-determined criteria. At 377, UI controller 330 receives a response to the message or alert from the user through the interview screen generated by UI controller 330 and at 378, writes received electronic tax return data (as received, or corrected or confirmed) and associated tags related to the confidence analysis to shared data store 340. The confidence score 221 may also be stored to the data store 240.

Processing by tax logic agent 310 may involve one or more or all of electronic tax return data 251, related results 251r and other data that may be stored to the data store 240 such as attributes 252 and determined confidence scores 221, which may be in the form of tags or labels for the corresponding electronic tax return data 251. Thus, FIG. 2A and 3A are provided as examples of how certain embodiments may be implemented. UI controller 330, confidence analysis module 320 and calculation engine 360 can be repeated as runtime electronic tax return data 351 in shared data store 340 is updated and additional non-binding suggestions 311 are received until a pre-determined status or conclusion such as completion or "done status" of a tax topic or preparation of a completed or fileable electronic tax return. Further details regarding embodiments and aspects of embodiments are described with reference to FIGS. 4-17. For ease of explanation, not limitation, reference is made to an embodiment in which UI controller 330 includes or utilizes confidence analysis module 320, but it will be understood that confidence analysis module 320 may be a component of or utilized by tax logic agent 310, or a component of or utilized by both UI controller 330 and tax logic agent 310 (e.g., in a distributed or shared confidence analysis module configuration performed using different computing systems and/or through one or more networks).

Figure 4:
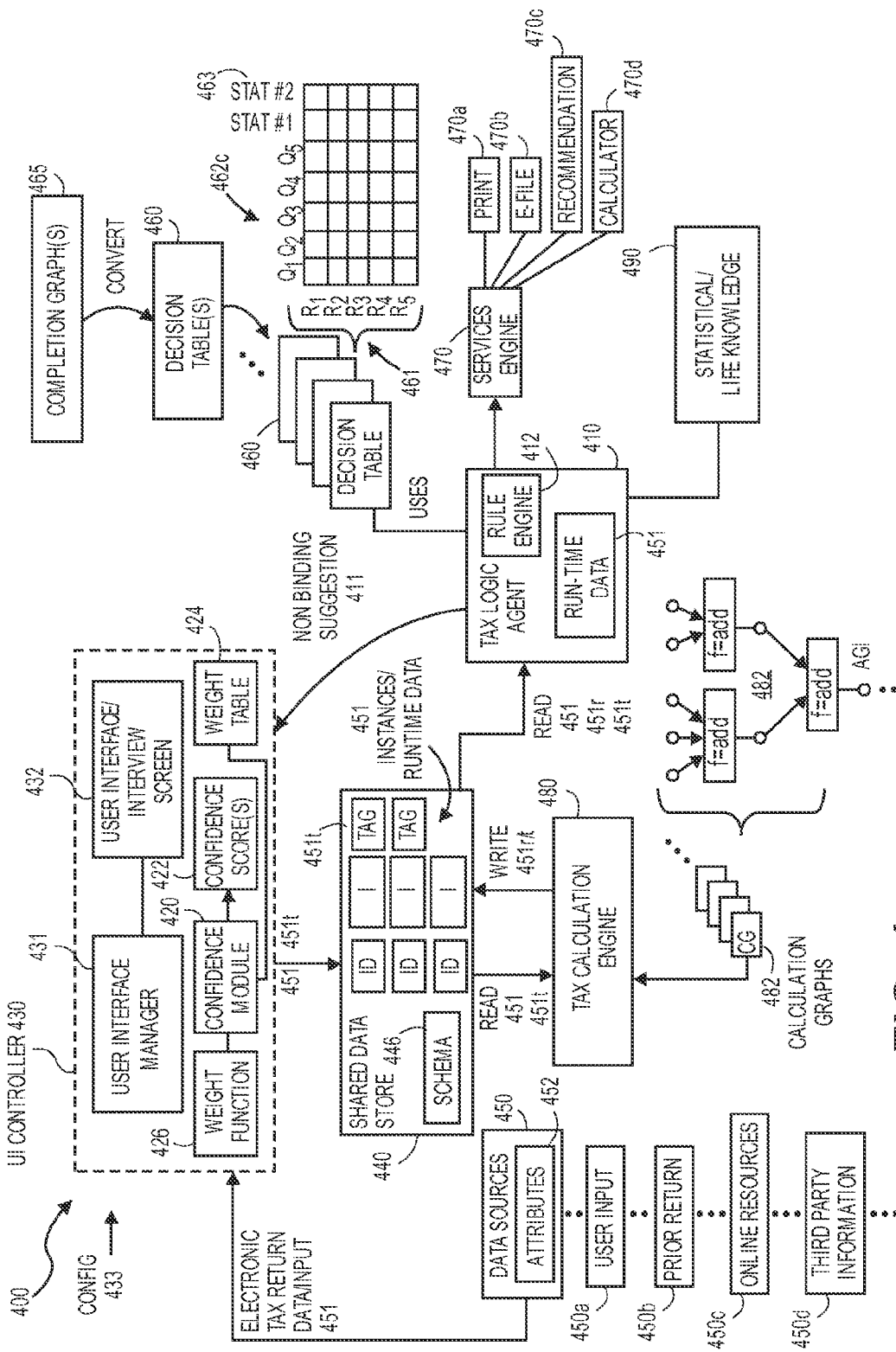
FIG. 4 illustrates a block diagram of a computerized system constructed according to one embodiment and illustrating system components and associated graph data structures and decision tables and how such system is configured to assess confidence in or trustworthiness of electronic tax return data based at least in part upon one or more attributes of data sources and how confidence-related data can be circulated among or utilized by various modular components of the system.

FIG. 4 illustrates one embodiment of a system 400 incorporating special purpose confidence analysis module or engine 420 and that involves tax logic agent 410 generating non-binding suggestions 411 including candidate questions 462 that are provided to UI controller 430 for consideration and possible processing. As shown in FIG. 4, system 400 includes tax logic agent 410 comprising or executing a rule engine or processor 412 that is used to scan or analyze decision tables 460 using runtime or instance data 442. Rule engine 412 may utilize a fact cache to generate either non-binding suggestions 411 for additional question(s) 462 to present to a user or "Done" instructions which indicate that completeness has occurred and additional input is not needed. Rule engine 412 may, for example, operate in the form a Drools expert engine. Other declarative rules engines 412 may be utilized and a Drools expert rule engine is provided as one example of how embodiments may be implemented. Tax logic agent 410 may be implemented as a dedicated module or engine that is executed by or as part of the tax return preparation application and may be embodied as a programmed subroutine that is executed by a processor or controller as described herein.

Further, given the modular nature of system components, components may be incorporated into a tax return preparation application or be executed as a distributed computing system, e.g., on two or more different computing systems through respective networks such that, for example, tax logic determinations can be determined separately of UI controller functions, which are performed separately of calculation engine processing. One or more modular components may be managed by respective independent computers through respective networks such that communications between components described herein may be performed through respective networks between respective computing devices, thus providing a distributed tax return preparation system in which UI determinations and interview screen presentment are independent of tax logic and tax calculations while being in communication with a shared data store 440.

In certain embodiments, and as illustrated in FIG. 4, tax logic agent 410 reads runtime data 442 from shared data store 440. UI controller 430 and tax calculation engine 480 are also in communication with shared data store 440. Tax logic agent 410 can read runtime data 442 from shared data store 440, UI controller 430 can write data to shared data store 440. Calculation engine 480 can read data from shared data store 440 and perform a calculation using a calculation graph 482 and write a calculation or result 451r to shared data store 440.

Tax logic agent 410 is operable to receive runtime or instance (I) data (generally, runtime tax return data 451) based on a "dictionary" of terms of data model or schema 446 (generally, schema 446). Schema 446 specifies, defines or lists tax-related concepts or terms, e.g., by names, type or category and hierarchy such as "name," "social security number," "citizenship," "address," "employer," "interest," "dividends," "mortgage," "deduction," "tax credit," "capital gain," etc.

An instance 442 is instantiated or created for the collection of data received and for each term or topic of schema 446. Schema 446 may also specify data constraints such as a certain format of questions and answers (e.g., answer is binary (Y/N) or a number/value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

An identity generator module (generally, ID generator) that generates an identifier (ID) for an instance (I) to be generated based on schema 446 of shared data store 440. Thus, embodiments involve an ID generator that generates identifier for instance 442 independently of shared data store 440 or processing element of or utilized by shared data store 440 to generate instances 442, and before instance 442 has been generated from schema 446. Thus, embodiments uniquely identify instances 442 and suggestions 411 that may involve the same term or element of schema 446. For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or non-binding suggestion 411, for example, and which ones are not.

With continuing reference to FIG. 4, runtime electronic tax return data 442 stored in shared data store 440 is used to populate corresponding fields of an electronic tax return or electronic tax forms or documents used to prepare electronic tax return and may be received from or based on data from various data sources 450a-d (generally, source 450). Examples of sources 450 include user input or manual entry of data into an interview screen 432 generated by UI controller 430, data imported from a prior year electronic tax return, data from online resources (such as online social networks such as facebook.com, linkedin.com or other online resources) and third parties databases or resources (such as government databases or documents, such as property tax records, Department of Motor Vehicle (DMV) records, etc. Tax logic agent 410 reads runtime electronic tax return data 442 from shared data store 440 and utilizes or executes rules 461 expressed in a data structure such as decision table 460 to determine, based on currently available runtime electronic tax return data 442, what other data or answers are still needed. In other words, tax logic agent 410 determines what conditions of a rule 461 still need to be satisfied in order to reach a conclusion or completeness status for subject matter of decision table 460, and in turn, which questions or topics 462 of decision table 460 or other data structure should be presented to user in order to obtain that other needed data to reach a conclusion. For example, a rule 461 specified by decision table 462 may be based on a tax authority requirement or law, and may generally specify that If X, and Y, and Z, then Conclusion.

Rules may involve various topics. "Tax" rules 461 that are utilized by rule engine 412 may specify types of data or tax documents that are required, or which fields or forms of the electronic tax return should be completed. One simplified example is if a taxpayer is married, then the electronic tax return is required to include information about a spouse. Tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 are utilized or scanned by tax logic agent 410 to identify or narrow which questions 462, as provided in decision table 460, are identified as potential or candidate questions 462 to be presented to the user. This may involve utilizing rules 461 based on one or more associated data structures such as decision table 460, which is based on a completion graph 465. Completion graph 465 recites, for example, requirements of tax authority or tax authority rules or laws. Decision table 460 may be used for invalidation of potential questions 462 or topics and input or runtime data 442 requirements.

FIGS. 5A-C and 6A-C illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5A:
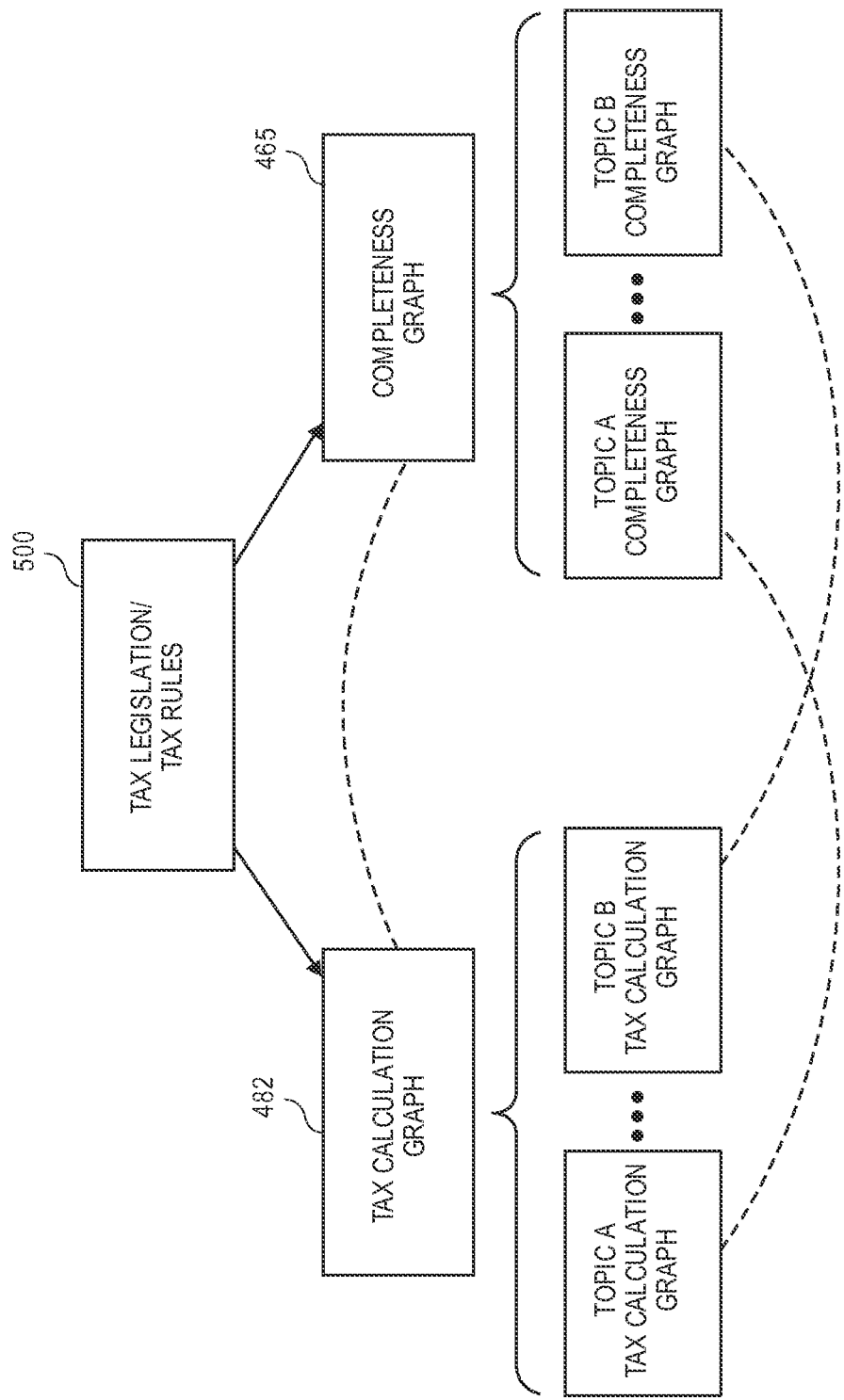
FIG. 5A schematically illustrates how tax legislation/tax rules are parsed and represented by a completeness graph and a tax calculation graph according to embodiments.

As shown in FIG. 5A, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed to prepare and ultimately file a tax return, and the tax return can be prepared and filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 5B:
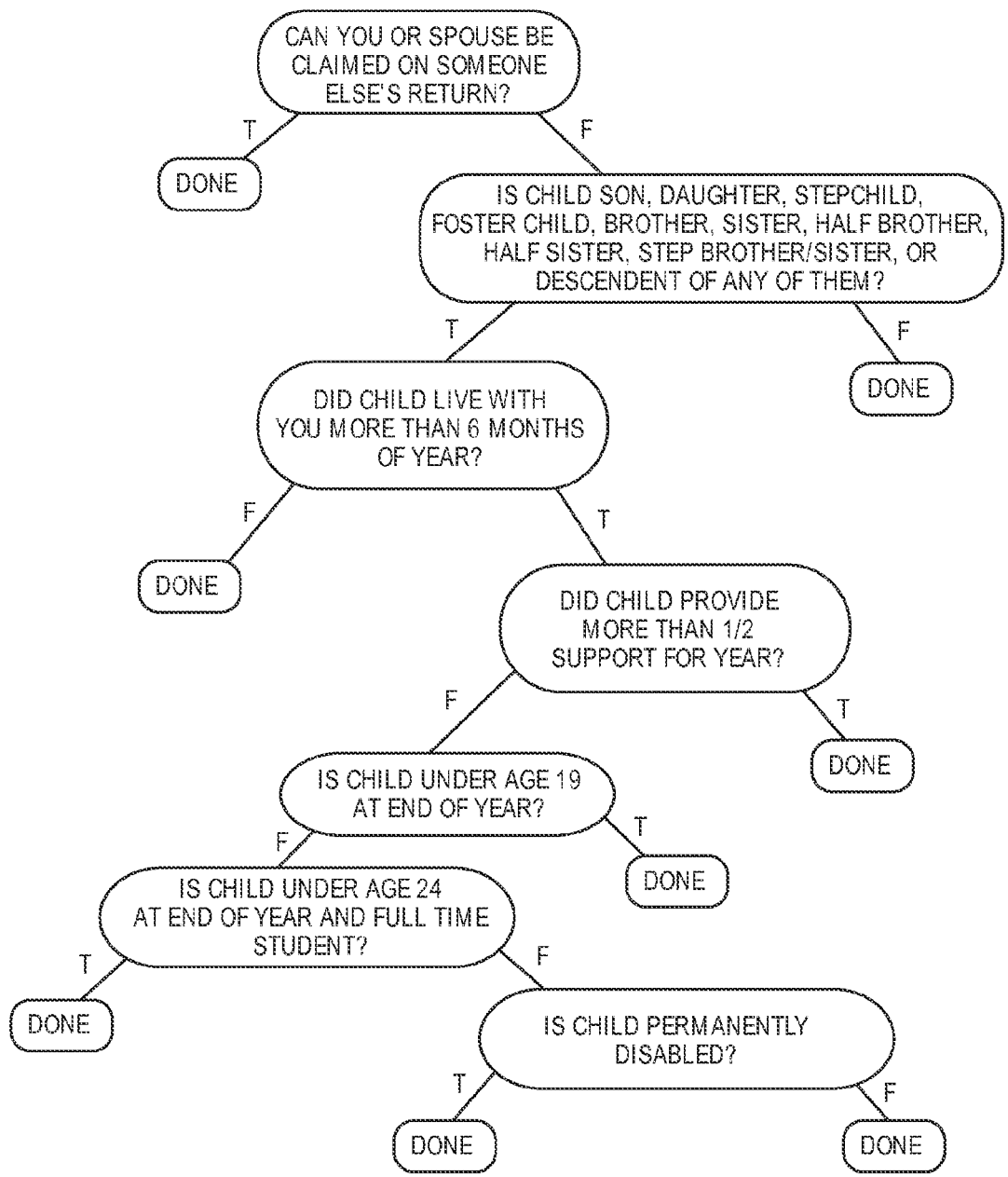
FIG. 5B illustrates an example of a simplified version of a completeness graph related to a qualifying child for purposes of determining deductions for federal income tax purposes.
Figure 5C:
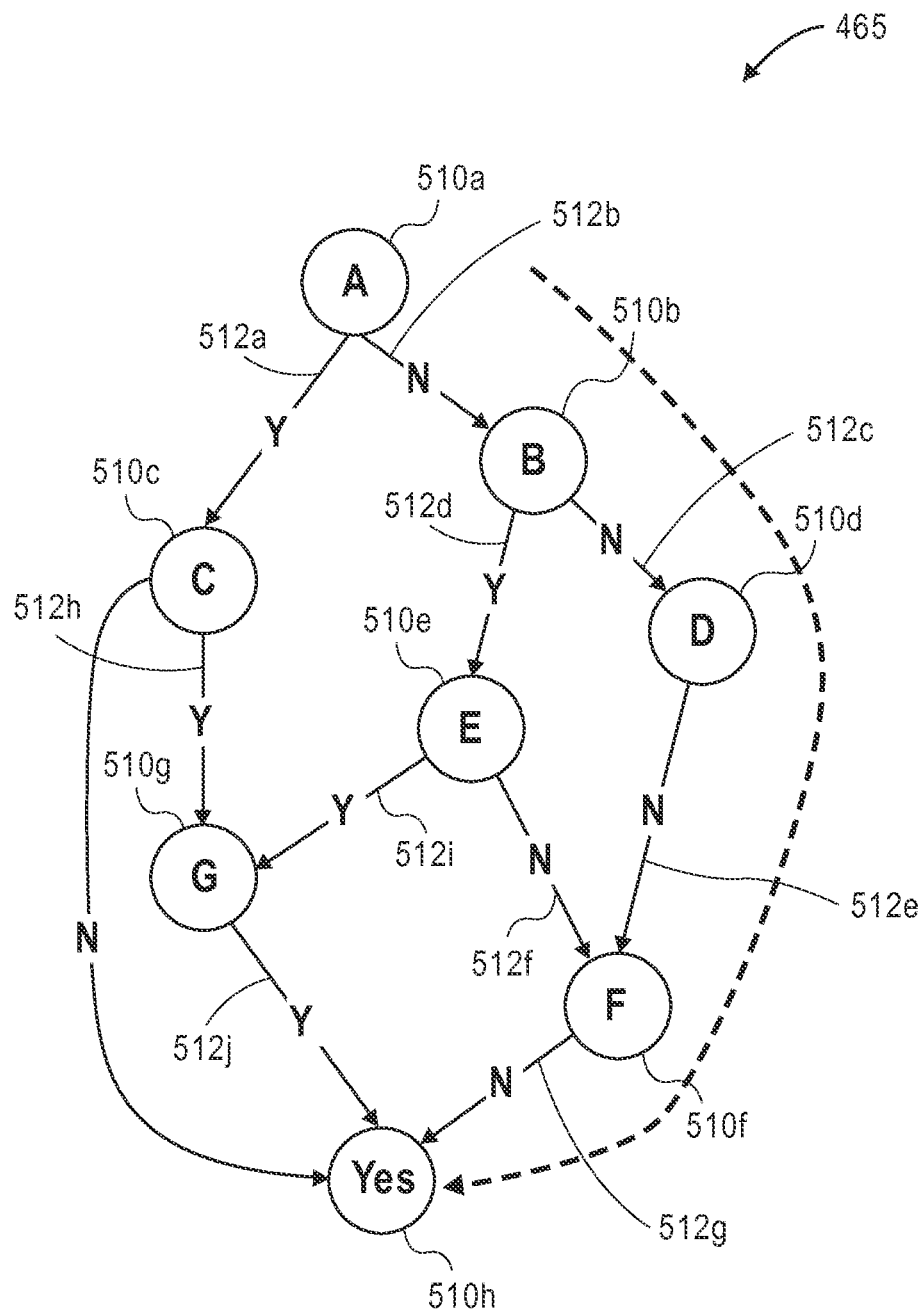
FIG. 5C illustrates an example of a directed graph or completeness graph.

Completeness graph 465 and tax calculation graph 482 represent data structures that can be constructed in the form of tree. FIG. 5C generally illustrates completeness graph 465 in the form of a tree structure including nodes 510a-g, in which node 510a is a beginning or start node, a "Yes" or termination node 510h indicating completion, and arcs 512 a-j representing different possible answers and the relationship between different nodes 510 or questions depend on a basic or general version of a completeness graph 465 for the particular topic, such as determining whether a child qualifies as a dependent for federal income tax purposes. FIG. 5B illustrates an example of a flow-chart based representation of questions, and a more complete flow chart-based representation of questions related to determining a "qualified child" may be found in U.S. patent application Ser. No. 14/097, 057, entitled "Methods Systems and Computer Program Products for Applying Generates Rules for Personalized Interview Experience," the contents of which are incorporated herein by reference as though set forth in full.

Each node 510 contains a condition that in this example is expressed as a Boolean expression that, in the illustrated embodiment, can be answered in the affirmative or negative. Arcs 512 that connect each node 510 illustrate the answers and dependencies between nodes 510, and the combination of arcs 512 in completeness graph 465 illustrates the various pathways to completion. A single arc 512 or combination of arcs 512 that result in a determination of "Done" represent a pathway to completion. As generally shown in FIG. 5C, there are several pathways to completion.

More specifically, FIG. 5C generally illustrates completeness graph 465 that includes beginning node (Node A) 510a, intermediate nodes (Nodes B-G) 510b-g and a termination node (Node "Yes" or "Done") 510h. Each of the beginning node 510a, and intermediate nodes 510b-g represents a question. Inter-node connections or arcs 512 represent response options. In the illustrated embodiment, each inter-node connection 512 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 5B, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 510 with a large number of pathways to completion. However, by many branches or lines within the completeness graph 465 can be ignored, for example, when certain questions internal to the completeness graph 465 are answered that eliminate other pathways, or other nodes 510 and arcs 512, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Referring to FIG. 6A, decision table 460 reflects the question-and-answer flow of completeness or directed graph 465. In the illustrated example, rows of decision table 460 define rules 461a-e (e.g., Rules R1-R5 as shown in FIG. 6A), and columns of the decision table 460 indicate questions 462a-g (Q1-Q5 shown in FIG. 4 OR Qa-Qg as shown in FIG. 6A). During processing, decision table 460 is scanned by tax logic agent 410 to determine which answers 464 or which aspects of a rule 461 or condition elements are included in received runtime data 442. Tax logic agent 410 determines how much the runtime data 442 completes decision table 460 and determines or selects candidate questions 462 to be presented to user.

Tax logic agent 410 uses decision tables 460 to analyze the runtime data 442 and determine whether a tax return is complete. Each decision table 460 created for each topic or sub-topic is scanned or otherwise analyzed to determine completeness for each particular topic or sub-topic. In the event that completeness has been determined with respect to each decision table 460, then rule engine 412 outputs a "done" instruction to UI controller 430. If rule engine 412 does not output a "done" instruction that means there are one or more topics or sub-topics that are not complete, which, as explained in more detail below presents interview questions to a user for answer. Tax logic agent 410 identifies decision table 460 corresponding to one of the non-complete topics or sub-topics and, using the rule engine 412, identifies one or more non-binding suggestions 411 to present to UI controller 430. Non-binding suggestions 411 may include a listing of compilation of one or more questions from one or more decision tables 460.

The following pseudo code generally expresses how a rule engine 412 functions utilizing a fact cache based on the runtime canonical data 442 or the instantiated representation of the canonical tax schema 446 at runtime and generating non-binding suggestions 411 provided as an input to UI controller 430.

As described in U.S. application Ser. No. 14/097,057 incorporated herein by reference, data such as required inputs can be stored to a fact cache so that the needed inputs can be recalled at a later time, and to determine what is already known about variables, factors or requirements of various rules:

Rule engine (412)/Tax Logic Agent (TLA) (410)
// initialization process
Load_Tax_Knowledge_Base;
Create_Fact_Cache; While (new_data_from_application)
Insert_data_into_fact_cache;
collection=Execute_Tax_Rules; // collection is all the fired rules and
corresponding conditions
suggestions=Generate_suggestions (collection);
send_to_application(suggestions);

In one embodiment, as shown in FIG. 6B, statistical data 463 (which may be appended as columns to rule-question decision table 460 shown in FIG. 6A, may be received from or based on data collected by life knowledge module 490 described in further detail below) indicates how likely a question or topic 462 is to be relevant to a user given a set of runtime data 442 and may be utilized by rule engine 412 when determining which candidate question or topic 462 to select. Instead of, or in addition to, statistical data, embodiments may also involve tax logic agent 410 executing one or more predictive models for purposes of determining how likely a question or topic 462 is to be relative to a given user based on input runtime data 442. Examples of predictive models that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data in the form of percentages. Column (STAT1 shown in FIG. 6B) may contain a percentage value that indicates taxpayers under the age of thirty-five where Rule' is satisfied. Another column (STAT2 shown in FIG. 6B) may contain a percentage value that indicates taxpayers over the age of thirty-five where Rule' is satisfied. Any number of additional columns could be added to the decision table 460 and statistics do not have to relate to an age threshold or grouping. Statistical data 463 may be used by the tax return preparation application to determine which of the candidate questions ($Q_A$-$Q_G$) 462 should be selected by tax logic agent 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions 462 that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Tax logic agent 410 may also receive or otherwise incorporate information from life knowledge module 490. Life knowledge module 490 contains statistical or probabilistic data and/or results generated by predictive models related to the current or other users of the tax return preparation application and/or other taxpayers. For example, life knowledge module 490 may indicate that taxpayers residing within a particular zip code are more likely to be homeowners than renters. Tax logic agent 410 may use this knowledge to weight particular topics or questions related to these topics when processing rules 461 and questions 462 and generating non-binding suggestions 411.

Non-binding suggestions 411 generated by tax logic agent 410 may be, for example, a question, declarative statement, identification of a topic and may include a ranked listing of suggestions 411. Ranking may be weighted in order of importance, relevancy, confidence level, or the like. According to one embodiment, statistical data or results generated by predictive models may be incorporated by tax logic agent 410 to be used as part of the candidate question ranking which, in turn, may be used by tax logic agent 410 to assign a ranking to the non-binding suggestions 411 generated by tax logic agent 410.

For example, questions 462 about home mortgage interest may be promoted or otherwise given a higher weight for users in particular zip codes or income levels. Statistical knowledge 490 or results generated by execution of predictive models may apply in other ways as well. For example, tax forms often require a user to list his or her profession. These professions may be associated with transactions that may affect tax liability. For instance, a taxpayer may list his or her occupation as "teacher." Life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring and ranking is used to select candidate questions 462 to use to generate a non-binding suggestion 411, and according to another embodiment, ranking is also used to impose a ranking of non-binding suggestions 411 themselves for reference by UI controller 430. For example, candidate questions 462 of a non-binding suggestion 411, and non-binding suggestions 411 themselves, may be ranked as described in U.S. application Ser. No. 14/462,058, filed Aug. 18, 2014, entitled "Computer Implemented Methods Systems and Computer Program Products for Ranking Non-Binding Suggestions During Preparation of Electronic Tax Return and U.S. application Ser. No. 14/461,982, filed Aug. 18, 2014, entitled "Computer Implemented Methods Systems and Computer Products for Candidate Question Scoring and Ranking During Preparation of Electronic Tax Return, the contents of all of which are incorporated herein by reference as though set forth herein in full. Such ranking may be based on, for example, a type of probability, estimate, assumption or inference determination, which may involve statistical analysis or execution of a predictive model using electronic tax return data as inputs.

Data that is contained within life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by life knowledge module 490. This information may be periodically refreshed or updated to reflect the most up-to-date relationships. Generally, the data contained in the life knowledge module 490 is not specific to a particular tax payer but is rather generalized to characteristics shared across a number of tax payers although in other embodiments, the data may be more specific to an individual taxpayer.

In one embodiment, rule engine 412 reads runtime data 442 and uses that data 442 as answers or inputs to decision table 460 to eliminate rules 461 that may apply which, is used to eliminate questions 462 from consideration rather than requiring the user to step through each question of a pre-determined sequence of questions in order to conclude that a particular tax situation or topic applies to the user.

For example, referring to FIG. 6C, and continuing with the example of decision table 465 shown in FIG. 6A, runtime data 442 that is known is used to determine which rows or rules 461 to cross out in decision table 460. In the illustrated example, if it is known from runtime data 442 that the answer to Question A is "Y" then rules 461 R3-R5 involving a "N" answer to Question A are not applicable, and those rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

Tax logic agent 410 provides to UI controller 430 a non-binding suggestion 411 comprising a selected question or topic 461 to be addressed. In the illustrated embodiment, UI controller 430 includes a UI or user experience manager 436 that determines how to process the non-binding suggestions 411 with selected questions or topics 461 and generates an interface or interview screen 432 for the UI or selects an interview screen of the UI based on the question or topic 461 of the non-binding suggestion 411. For ease of explanation, reference is made to interview screen generator 432 or resulting interview screen 432. UI controller 430 may include suggestion resolution element, a generator element, and an interview screen management element or flow/view management" module, as described in U.S. application Ser. No. 14/097,057, filed Dec. 4, 2013, entitled Methods Systems and Computer Program Products for Applying Generated Rules for Personalized Interview Experience", the contents of which are incorporated herein by reference as though set forth in full.

For example, as described in the above-identified incorporated application, a configuration file 433 of UI controller 430 may specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that UI controller 430 should wait for additional data and/or until a final review stage initiated by the user. As another example, this may involve classifying non-binding suggestions 411 as being ignored. A configuration file 433 may also specify content (e.g., text) of the interview screen that is to be generated based at least in part upon a non-binding suggestion 411.

UI manager 436 of UI controller 430 may include a generator element that is in communication with a suggestion element and that generates the resulting user interaction or experience or creates or prepares an interview screen 432 or content thereof based on the output of the suggestion element and input received from the interview screen management element. For this purpose, generator element may communicate with the interview screen management element, which manages a library of visual assets. Visual assets may be pre-programmed interview screens that can be selected by the interview screen management element and provided to the generator element for providing resulting interview screen 432 or content or sequence of interview screens 432 for presentation to the user. Visual assets may also include interview screen 432 templates, which are blank or partially completed interview screens 432 that can be utilized by the generation element to construct an interview screen on the fly during runtime in the event that an appropriate pre-programmed or pre-determined interview screen or other visual asset is not available or cannot be identified by the interview screen management element.

More specifically, in one embodiment, as described in the incorporated application, UI manager 436 of the UI controller 430 includes a suggestion resolution element or "Suggestion Resolver," a generator element 342 or "Generator," and an interview screen management element 343 or "Flow/View Management." The suggestion resolution element is responsible for resolving the strategy of how to respond to incoming non-binding suggestions 411. For this purpose, the suggestion resolution element may be programmed or configured internally, or based on interaction configuration files 433, which specify whether, when and/or how non-binding suggestions 411 are processed. For example, a configuration file 433 may specify a particular priority or sequence of processing non-binding suggestions 116 such as now or immediate, in the current interview screen, in the next interview screen, in a subsequent interview screen, in a random sequence (e.g., as determined by a random number or sequence generator), or that the UI manager 436 should wait for additional data and/or until a final review stage initiated by the user. As another example, this may involve classifying non-binding suggestions as being ignored. A configuration file 433 may also specify content (e.g., text) of the interview screen 123 that is to be generated based at least in part upon a non-binding suggestion 411.

The generator element is in communication the suggestion element and generates the resulting user interaction or experience or creates or prepares an interview screen 432 or user interface or content thereof based on the output of the suggestion element and input received from the interview screen management element. For this purpose, the generator element may communicate with the interview screen management element, which manages a library of visual assets. Visual assets may be pre-programmed interview screens that can be selected by the interview screen management element and provided to the generator element for providing the resulting interview screen or content or sequence of interview screens to the UI 432 for presentation to the user. Visual assets may also include interview screen templates, which are blank or partially completed interview screens that can be utilized by the generation element to construct an interview screen 432 on the fly during runtime in the event that an appropriate pre-programmed or pre-determined interview screen or other visual asset is not available or cannot be identified by the interview screen management element. The following exemplary pseudocode describes system components and data described above:

Suggestion Resolution Element
// Take a suggestion and consult the behavior configuration to
// decide which ones the UI will handle
Suggestions=Get_suggestions_from_TLA;
New_list=Rank_and_Filter(Suggestions, Configuration_File);
Generation Element
For each item in New_list
UI_asset=Flow_View_Manager(item);
If UI_asset==NULL // if Flow_View_Manager does not have any ready
to go asset for the item
Template=Get_Template(item) // identify a template based on the item e.g. its type
UI_asset=Construct_UI_Asset(Template, item)
End
End
Interview Screen Management Element
Provide look-up capability to return UI asset (flow/view) if there is any, for given model field For ease of explanation and illustration, reference is made to UI controller 430, which, given the use of data structures described herein, permits the UI controller 430 to be loosely connected or even divorced from the tax logic agent 410 and tax calculation engine 480 and the data used in the tax calculations that is stored in shared data store 440.

Figure 7:
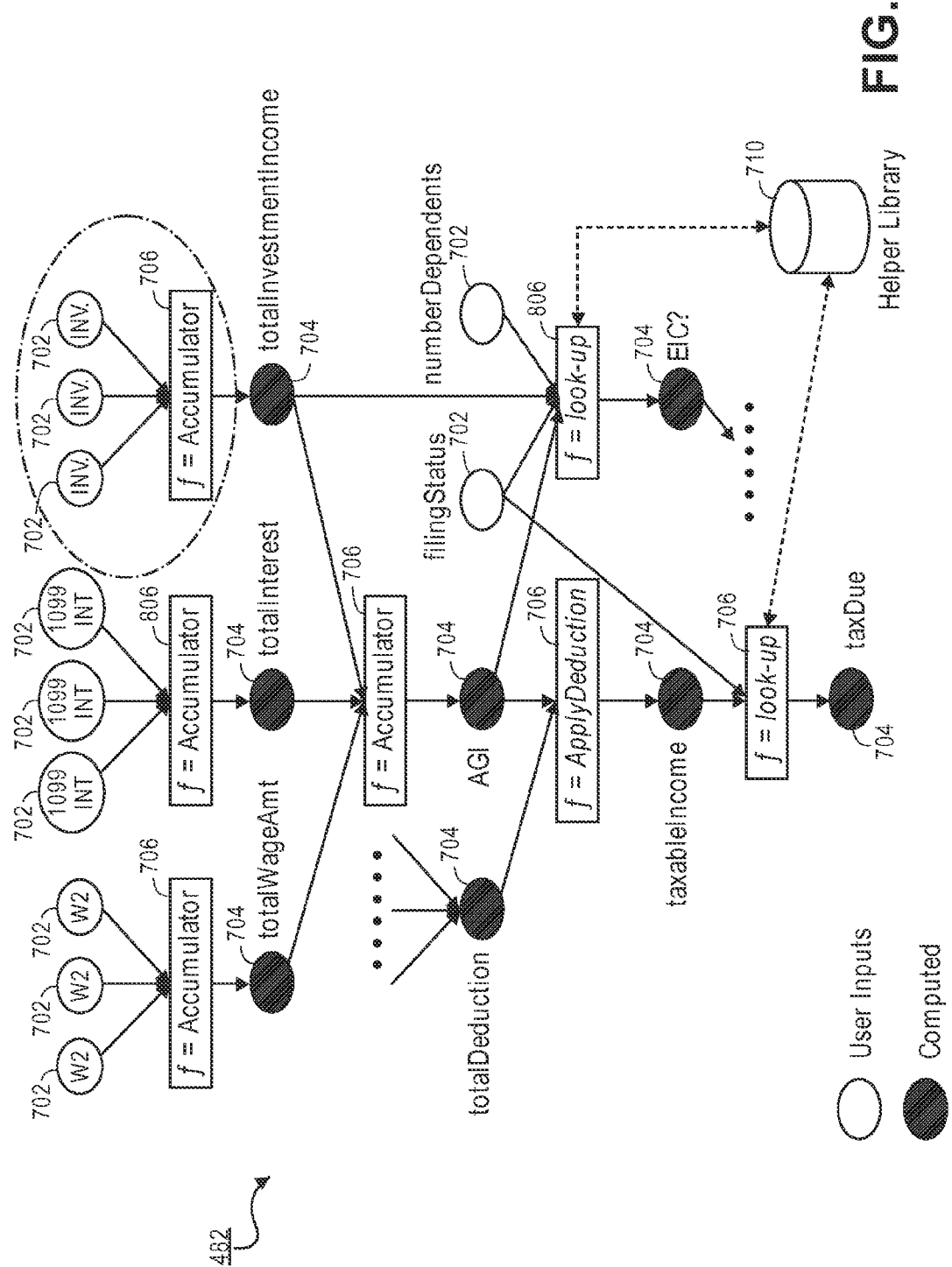
FIG. 7 illustrates an example of a calculation graph.

With continuing reference to FIGS. 4 and 7, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by tax logic agent 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

FIG. 7 illustrates one example of a tax calculation graph 482. Tax calculation graph 482 semantically describes data dependent tax operations that used perform a tax calculation in accordance with the tax code or tax rules. Tax calculation graph 482 in FIG. 7 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 7, various nodes 702 are input nodes. Examples of input nodes 702 in this particular example include data obtained from W-2 forms, data obtained from 1099-INT forms, data obtained from other investment income (INV), filing status, and number of dependents. Typically, though not exclusively, input nodes 702 are populated with user inputs. That is to say the user taxpayer will enter this information from a user interface as described herein. In other embodiments, however, nodes 702 may be populated with information that is automatically obtained by the tax preparation software. For example, in some embodiments, tax documents may be imaged or scanned with relevant data being automatically extracted using Optical Character Recognition (OCR) techniques. In other embodiments, prior tax returns may be used by the tax preparation software to extract information (e.g., name, potential dependents, address, and social security number) which can then be used to populate nodes 702. Online resources such as financial services websites or other user-specific websites can be crawled and scanned to scrape or otherwise download tax related information that can be automatically populated into nodes 702. Additional third party information sources such as credit bureaus, government databases, and the like can also be used by the tax preparation software to obtain information that can then be populated in to respective nodes 702.

In still other embodiments, values for nodes 702 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for nodes 702 may be estimated.

Still other internal nodes referred to as functional nodes 704 semantically represent a tax concept and may be calculated or otherwise determined using a function 706. Functional node 704 and the associated function 706 define a particular tax operation. For example, as seen in FIG. 7, operation refers to total wage income and is the result of the accumulator function 706 summing all W-2 income from input nodes 702. Functional node 704 may include a number in some instances. In other instances, the functional node 704 may include a response to a Boolean expression such as "true" or "false." Functional nodes 704 may also be constant values in some instances. Some or all of these functional nodes 704 may be labelled as "tax concepts" or "tax topics." The combination of a functional node 704 and its associated function 706 relate to a specific tax operation as part of the tax topic.

Interconnected function nodes 704 containing data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability. For example, examples of such commonly reoccurring functions 806 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 706 that is used to compute or calculate a tax liability is stored within a data store 710 which in some instances may be a database. The various functions 706 that are used to semantically describe data connections between function nodes 704 can be called upon by the tax preparation software for performing tax calculations. Utilizing these common functions 706 greatly improves the efficiency of the tax preparation software can be used by programmer to more easily track and follow the complex nature of the ever-evolving tax code. The common functions 706 also enables easier updating of the tax preparation software because as tax laws and regulations change, fewer changes need to be made to the software code as compared to prior hard-wired approaches.

Tax calculation graph 482 and the associated function nodes 704 and functions 706 can be tagged and later be used or called upon to intelligently explain to the user the reasoning behind why a particular result was calculated or determined by the tax preparation software program. Functions 706 can be de-coupled from a specific narrow definition and instead be associated with one or more explanations. Examples of common functions 706 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 706 may also include any number of mathematical or other operations. Examples of functions 706 include summation, subtraction, multiplication, division, and comparisons, greater of, lesser of, at least one of, calling of look-ups of tables or values from a database 710 or library as is illustrated in FIG. 7. It should be understood that the function nodes 704 in the tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 704 may be found in multiple locations within the tax calculation graph 482. Taxable income is another example of such a function node 704.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. A smart tax logic agent 410 running on a set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

In the embodiment illustrated in FIG. 4, UI controller 430 also includes or utilizes an identity generator module that generates an identifier (ID) for an instance (I) to be generated based on schema 446 of shared data store 440. Thus, embodiments involve an ID generator that generates identifier (I) for instance (I) independently of shared data store 440 or processing element of or utilized by shared data store 440 to generate instances, and before instance has been generated from schema 446. Further, in the embodiment illustrated in FIG. 4, embodiments involve UI controller 430 including ID generator to generate instance identifier and later receive non-binding suggestion 411 with that same instance identifier for continuing reference by UI controller 430 when processing suggestions 411 and writing results 451r or electronic tax return data 451 to shared data store 440. Thus, embodiments, uniquely identify instances and non-binding suggestions 411, which may involve the same term or element of schema 446.

For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or suggestion 411, for example, and which ones are not. Further embodiments and aspects of embodiments are described in further detail below with reference to FIGS. 8-17.

Figure 8:
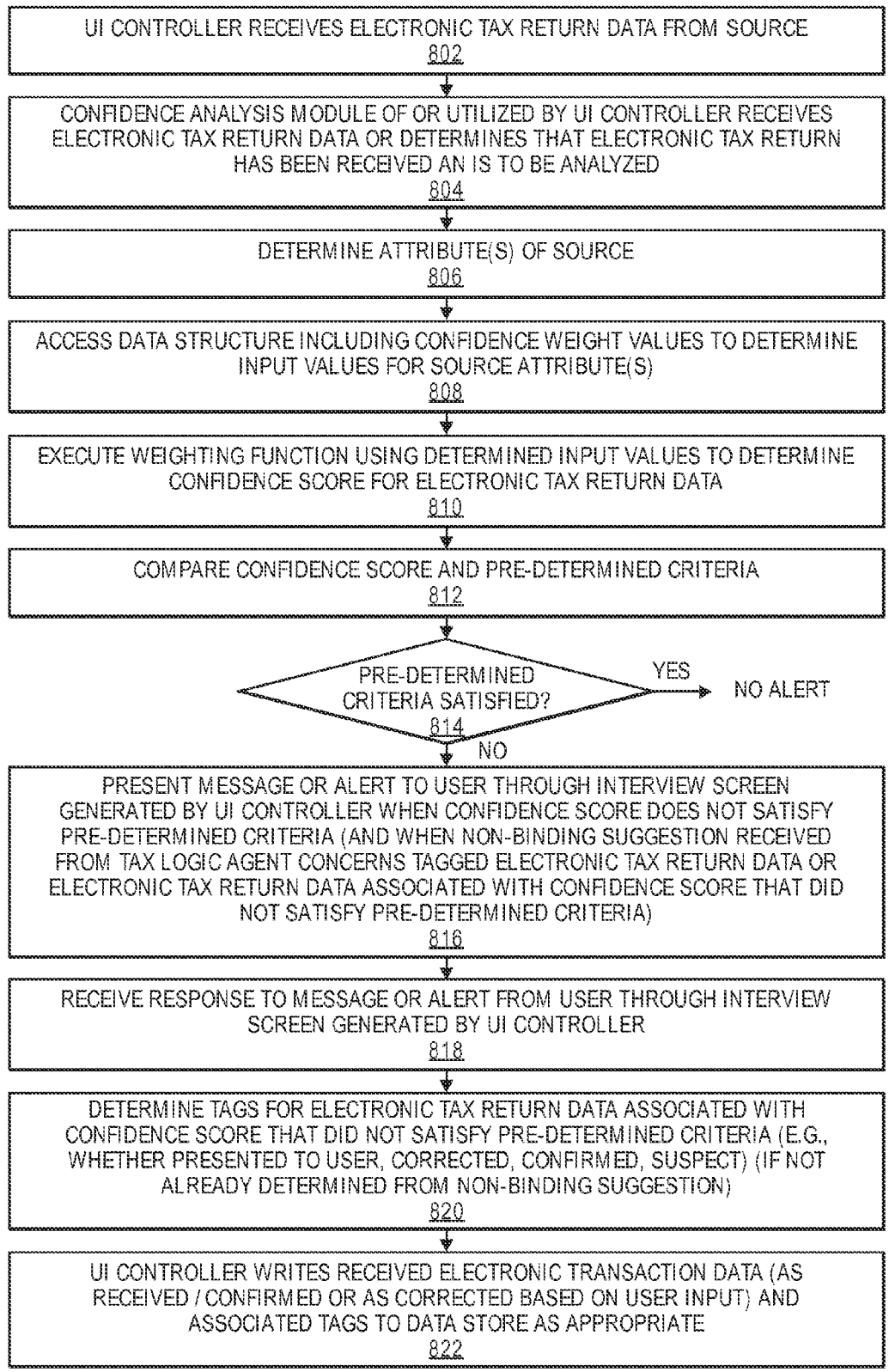
FIG. 8 is a flow diagram of one embodiment of a computer-implemented method involving a user interface controller utilizing a confidence analysis module to determine confidence scores for electronic tax return data and, present screens or messages to a user regarding certain data, and writing electronic tax return data and associated confidence related tags to a shared data store.

With continuing reference to FIG. 4, and with further reference to FIG. 8 involving UI controller 430 including or utilizing confidence analysis module 420, at step 802, UI controller 430 receives electronic tax return data 451 from shared data source 450, and at 804, confidence analysis module 420 of or utilized by UI controller 430, receives electronic tax return data 451 or determines that electronic tax return data 451 has been received and is to be analyzed. At 806, confidence analysis module 420 determine attribute(s) 452 of source 451 of electronic tax return data 451, and at 808, confidence analysis module 420 accesses a weight table or other data structure 424 of confidence weight values or factors, which will be used as input values to a weighting function or algorithm.

For example, confidence analysis may involve attribute 452 of source 450 identification, which may involve a name, category or location of source 450. Confidence analysis may also involve source attribute 452 of the format of electronic tax return data 451, such as a whether the data is in a .pdf file, a word processing (.doc) or spreadsheet (.xls) document, an electronic format utilized by financial institutions (e.g., .OFX), an electronic format utilized by a tax authority, or an electronic format (e.g., .tax) utilized by a tax return preparation application such as TURBO TAX tax return preparation application. TURBO TAX is a registered trademark of Intuit Inc., Mountain View, Calif. Confidence analysis may also involve a source attribute 452 in the form of a communication method, e.g., whether the electronic tax return data 451 was manually entered by a user, transmitted from a local computer or local file, e.g., an electronic tax return file of a prior tax year, or transmitted from a remote computer through a network. Confidence analysis may also involve an output or score generated by a recognition system such as an optical character recognition (OCR) system or speech recognition system. Confidence analysis may also involve a combination of these confidence factors, and different factors may be emphasized more than others via a weighting function or algorithm 424.

Certain embodiments may involve a single source attribute 452, and a ranking or priority of source attributes, or determination of a factor or weight value of a source attribute, e.g., by use of a weight table 424 or other data structure that indicates a weight or relative importance or priority reflective of relative trustworthiness or confidence in data received from a source 450 given a source attribute 452.

For example, for an attribute 452 of source identification or category, a source 450 that is a tax authority may be ranked higher than a source 450 that is a financial institution, which is ranked higher than a source 450 that is a financial management system (such as MINT or QUICKEN financial management systems), which is ranked higher than a source 450 that is user or manual entry, which is ranked higher than a source 450 that is recognition process such as optical character recognition or speech recognition (since such recognition processes may or may not be reliable depending on the equipment used, source document and system capabilities), which is ranked higher than a source 450 that is an on-line social networking website (given the often informal nature and various uses of such websites).

As another example, for an attribute 452 of source 450 of format of electronic tax return data 451, electronic files in .ofx format may be ranked higher than electronic files in .tax format, which are ranked higher than electronic files in .xls format (e.g., for a spreadsheet program), which is ranked higher than electronic files in .doc format (e.g., for a word processing program), which are ranked higher than electronic files in a .pdf format (e.g., a .pdf file of a prior year return which, if the data thereof is not readable by a system, may need to be processed using a recognition process).

As another example, for an attribute 452 of source 450 in the form of a communication method, electronic transfer from a locally stored file may be ranked higher than electronic transfer of a file through a network, which is ranked higher than importing data from a financial management system, which is ranked higher than manual entry of data by a user.

As another example, for an attribute 452 of source 450 in the form of a recognition process, OCR may be ranked higher than voice or speech recognition, and scores or numerical accuracy results generated by a recognition process may be utilized by the confidence analysis module 420.

For purposes of illustration, not limitation, weight table or other data structure 424 may involve a ranking or weighting scale of 0-1, or 0-100%, may be used to indicate the level of trustworthiness of a source 450, such that, when considering source identification, category or type data, a source 450 of a tax authority may be assigned a high confidence value or weight of, e.g., 0.95, a source 450 of a financial institution that provides a tax document to the user may be assigned a high confidence value or weight of 0.9, a source 450 of a financial management system (such as MINT or QUICKEN financial management system) may be assigned a value or weight of 0.5, and a recognition process such as optical character recognition or speech recognition may be assigned a lower value or weight of 0.3 or a weight based on an accuracy assessment or score generated by the recognition processes, and manual data entry may be assigned a lower value or weight of 0.25. Of course, these confidence values weights may be changed for particular applications and are provided as illustrative examples.

For an attribute 452 of source 450 in the form of data format, electronic files in .ofx format may be assigned a value or weight of 0.9, electronic files in .tax format may also be assigned a value of 0.9, whereas electronic files in .xls format (e.g., for a spreadsheet program) may be assigned a value or weight of 0.3, and electronic files in .doc format (e.g., for a word processing program) may be assigned a value or weight of 0.2. Again, it will be understood that these weights, and relative trustworthiness, are subjective and may be modified, and are provided merely as examples.

For an attribute 452 of source 450 in the form of a communication method, electronic transfer of electronic tax return data 451 from a locally stored file may be considered to be the most trustworthy and assigned a value or weight of 0.9, and electronic transfer of a file through a network is assigned a value or weight of 0.8, whereas importing electronic tax return data 451 from a financial management system is assigned a value or weight of 0.5, and manual entry of electronic tax return data 451 is assigned a value or weight of 0.2. Again, it will be understood that these weights, and relative trustworthiness, are subjective and may be modified, and are provided merely as examples.

For an attribute 452 of source 450 in the form of a recognition process, OCR may be ranked higher than voice or speech recognition (e.g., 0.7 vs 0.5), and scores or numerical accuracy results generated by a recognition process may be utilized by the confidence analysis module 420. Again, it will be understood that these weights, and relative trustworthiness, are subjective and may be modified, and are provided merely as examples.

Referring again to FIG. 8, at 810, in embodiments in which the confidence analysis module 420 considers multiple source attributes 452, the weight or rank factors or values (e.g., as noted above), are determined and used as inputs to a weighting function or algorithm that considers a combination of weight or rank values to determine a confidence score for the electronic tax return data 451 received from the source 450 with those attributes 452.

For example, a weighting function of or used by confidence analysis module 420 may consider different combinations of attributes 452 including: source identification and data format; source identification and communication method; source identification and recognition system; data format and communication method; data format and recognition system; communication method and recognition system; source identification, data format and communication method; source identification, data format and recognition system; data format, communication method and recognition system; or all four of these exemplary attributes 452.

Thus, a weight function 426 may prioritize a source attribute 452 of data format (0.7) over a source attribute of communication method (0.3) such that when considering retrieving data from a locally stored spreadsheet (.xls) file, the weighting function may be (0.7*0.3 for .xls format)+(0.3*0.9 for local file)=0.21+0.27=0.48, whereas if a weight function 426 prioritizes communication method (0.7) over data format (0.3), the weighting function for this same attribute combination example is: (0.3*0.3 for .xls data format)+(0.7*0.9 for transfer from local file)=0.09+0.63=0.72). It will be understood that these numerical examples are merely provided for purposes of illustration and explanation, and that the confidence module 420 may utilize various weighting functions 426 and various weight table 424 priorities for different combinations of source attributes 452 and associated factors or values, and that weighting functions 426 may involve more complicated expressions than the examples provided.

Referring again to FIG. 8, having executed the weight function 426 to determine a confidence score 422 for the electronic tax return data 451, at 812, confidence module 420 compares the determined confidence score 422 and pre-determined criteria. For example, the pre-determined criteria may be a value of at least 0.5. At 814, confidence analysis module 420 determines whether confidence score 422 satisfies the pre-determined criteria. If yes, no further action such as an alert is necessary, but if not (e.g., the confidence score is <0.5), then further action can be taken.

For example, continuing with the function and confidence score examples noted above, the confidence score 422 of 0.72 (resulting from prioritizing attribute 452 of local file transfer over data format) would satisfy the pre-determined criteria of at least 0.5, but confidence score 422 of 0.48 (resulting from prioritizing attribute 452 of data format over local file transfer) would not since 0.48<0.50. Thus, for confidence scores 422 that do not satisfy the pre-determined criteria, at 816, confidence analysis module 420 notifies UI controller 430 as necessary, and UI controller 430 presents a message or alert to user through interview screen 432 generated by UI controller 430 (and/or when non-binding suggestion 411 received from tax logic agent 411 concerns tagged electronic tax return data 451*t* ("t" referring to tag or tagged) as discussed in further detail below).

Figure 9:
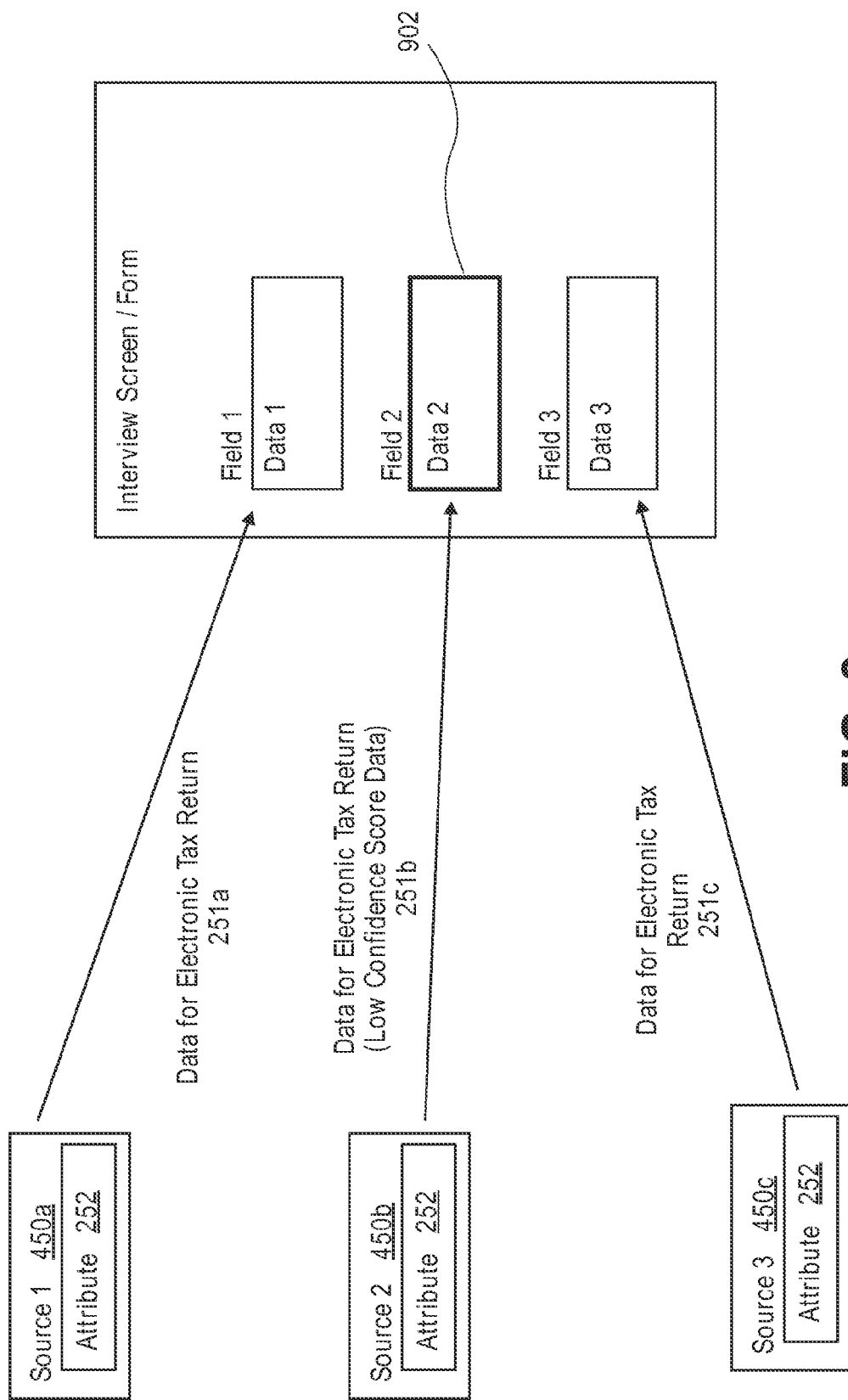
FIG. 9 illustrates one example of an alert or message that may be presented to the user to inform the user about low confidence electronic tax return data or electronic tax return data that failed to satisfy pre-determined criteria.

For example, referring to FIG. 9, UI controller 430 may identify or emphasize a particular field 902*b* populated with data 451 or the data 451 that is associated with confidence score 422 that did not satisfy the pre-determined criteria, whereas other fields 902*a*, 902*c* that include data 451*a*, 451*c* that satisfied the pre-determined criteria are no so identified or emphasized. While FIG. 9 illustrates an emphasized field 902*b*, the user may also be presented with a message or explanation regarding why the field 902 was identified or asking the user to review and confirm or correct the data 451 within that field 902. Moreover, while FIG. 9 shows an example of three different sources 450*a-c* providing respective data 451*a-c* for respective fields 902*a-c*, it will be understood that this is for illustrative purposes, and that electronic tax return data 451 can be obtained from one or multiple sources 450, and such data may be within one or multiple sections of the tax return or addressed in one or more interview screens presented by the UI controller 430.

With continuing reference to FIG. 8, at 818, UI controller 430 receives a response to the message or alert from user through interview screen 432 generated by UI controller 430, and at 820, may determine tags or labels 451*t* for electronic tax return data 451 associated with confidence score 422 that did not satisfy pre-determined criteria, e.g., whether the user was notified regarding the data 451, whether the user corrected or confirmed the data 451, or whether no correction or confirmation has been received such that the data 451 is suspect or questionable. At 822, UI controller 430 writes received electronic tax return data 451 (as received/confirmed or as corrected based on user input) and associated tags 451*t* as appropriate to shared data store 440.

Figure 10:
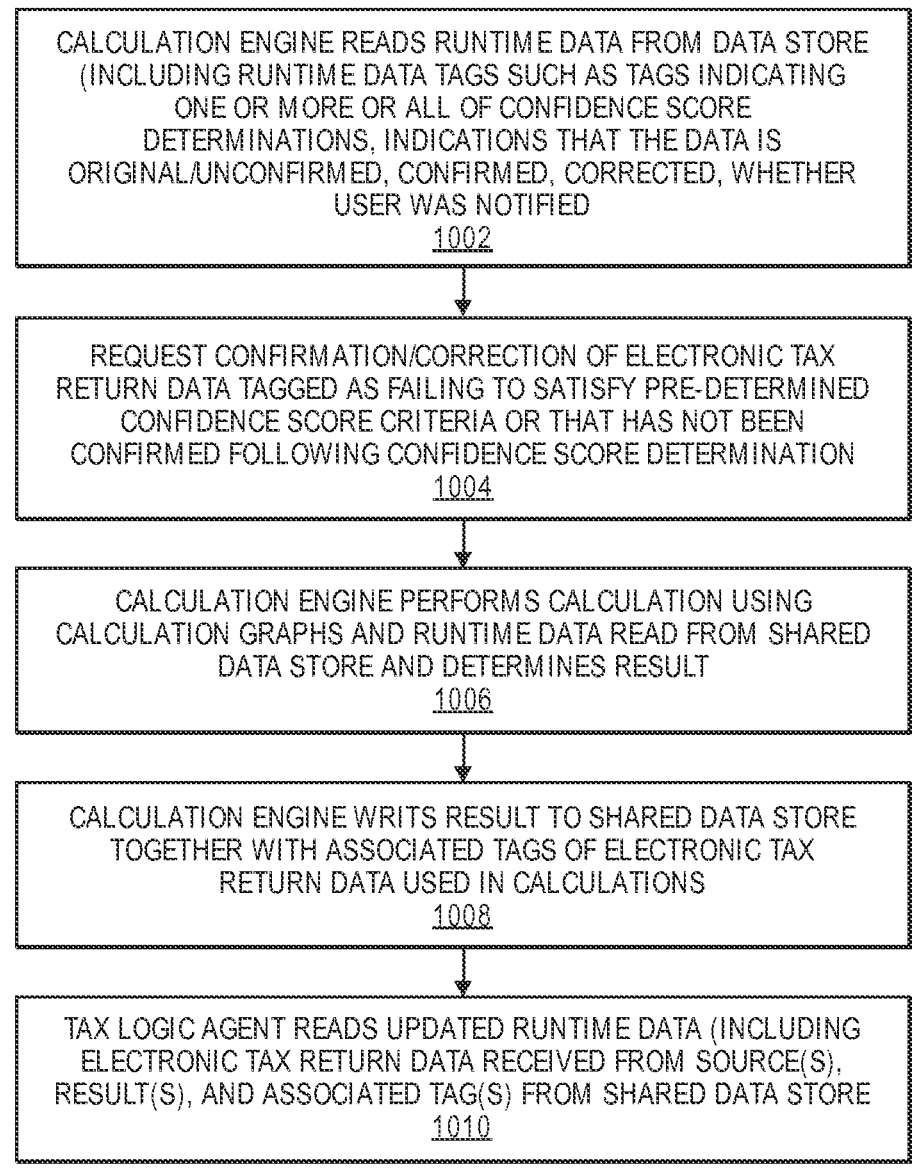
FIG. 10 is a flow diagram illustrating calculation engine processing of runtime data including a result generated by the user interface controller processing non-binding suggestions generated according to embodiments and how a calculation engine can results generated by a confidence module.

Referring to FIG. 10, at 1002, calculation engine 480 reads runtime data 451 from data store 440 (including runtime data tags 451*t* such as tags 451*t* indicating confidence score 422 determinations, original/unconfirmed runtime data, confirmed runtime data, corrected runtime data). In the event that a tag 451*t* indicates that electronic tax return data 451 was not confirmed or corrected, calculation engine 480 may, in certain embodiments, request UI controller 430 confirmation/correction of electronic tax return data tagged 451*t* as failing to satisfy pre-determined confidence score criteria or that has not been confirmed following confidence score 422 determination. Tags 451*t* may also indicate the source attribute 452 and a confidence score 422 that was generated for electronic tax return data 451.

At 1006, calculation engine 480 uses calculation graphs 482 and runtime data 451 read from shared data store 440 and determines a calculation result 451*r* ("r" referring to result). At 1008, calculation engine 480 writes result 451*r* to shared data 440 store together with associated tags 451*t* of electronic tax return data used in the calculation. In this manner, if electronic tax return data 451 used in the calculation is associated with a low confidence score 422, the result 451r is marked or tagged in a similar manner to indicate that the result 451r is also based at least in part upon low confidence electronic tax return data 451.

Figure 11:
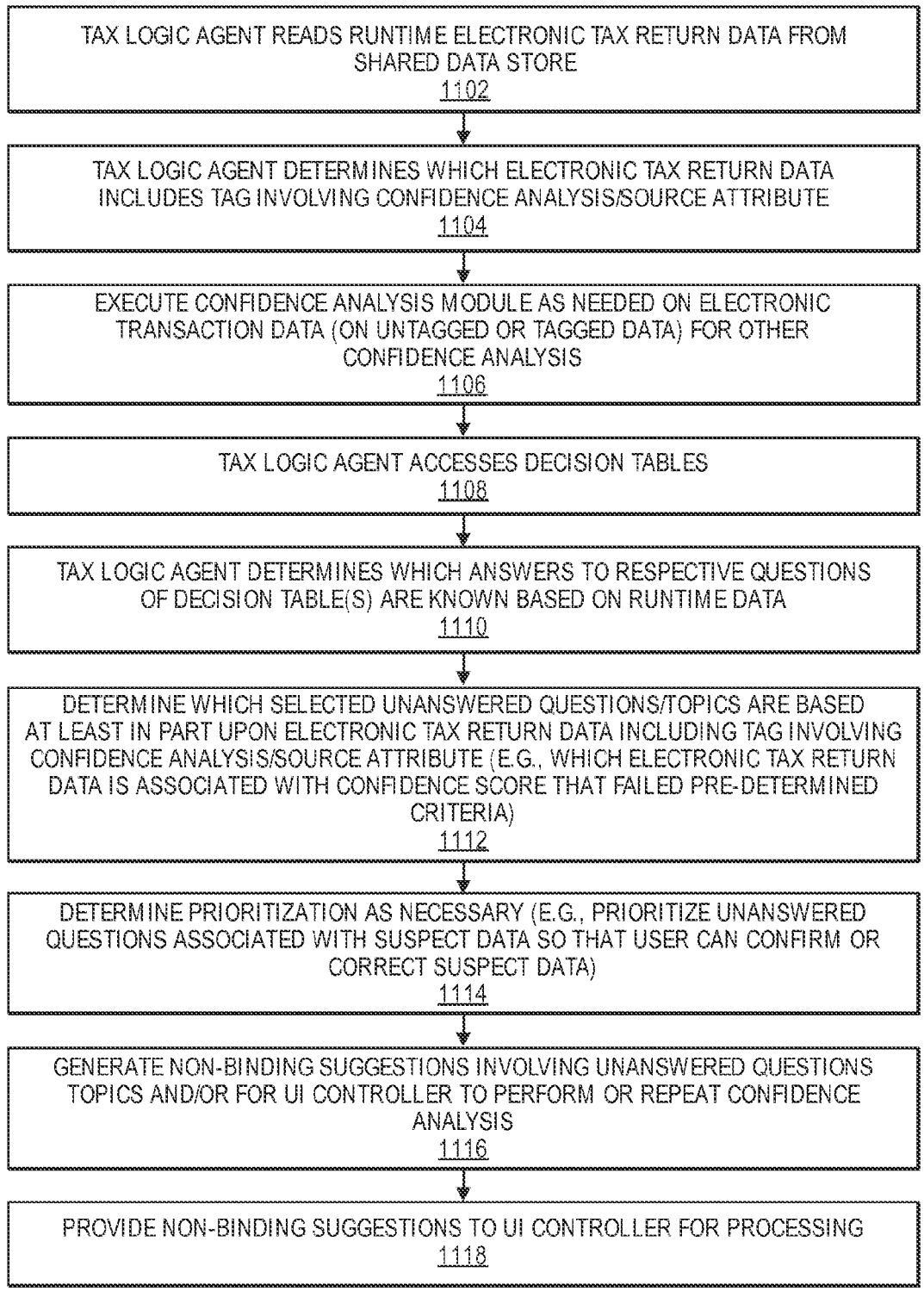
FIG. 11 is a flow diagram illustrating tax logic agent processing based on electronic tax return data read from a shared data store that may include results determined by the calculation engine and confidence-related tags.

At 1010, and with further reference to FIG. 11, tax logic agent 410 reads updated runtime data 451 (including electronic tax return data 451 received from source(s) 450, result(s) 451r, and associated tag(s) 451t from shared data store 440. At 1102, tax logic agent 410 reads runtime electronic tax return data 451 from shared data store 440 (including results 451r), and at 1104, tax logic agent 410 determines which electronic tax return data includes tag involving confidence analysis/source attribute. At 1106, tax logic agent, if so configured, may execute confidence analysis module 402 as needed on electronic tax return data 451 (on untagged or tagged data) for other confidence analysis, e.g., to repeat confidence analysis for low confidence data, or to initially perform an analysis if not already performed by UI controller 430. At 1108, tax logic agent 410 accesses decision tables 460, determines which answers to respective questions 462 of decision table(s) 460 are known based on runtime data 451 at 1110, and determines which selected unanswered questions 462/topics are based at least in part upon electronic tax return data 451 including tag 451t involving confidence analysis/source attribute 452 (e.g., which electronic tax return data 451 is associated with confidence score 422 that failed pre-determined criteria) at 1112. At 1114, tax logic agent 410 determines prioritization as necessary (e.g., prioritize unanswered questions 462 associated with suspect data so that user can confirm or correct suspect data), and at 1116, generates non-binding suggestions involving unanswered questions topics and/or for UI controller 430 to perform or repeat confidence analysis. At 1118, non-binding suggestions 411 are provided to UI controller 430 for processing.

Figure 12:
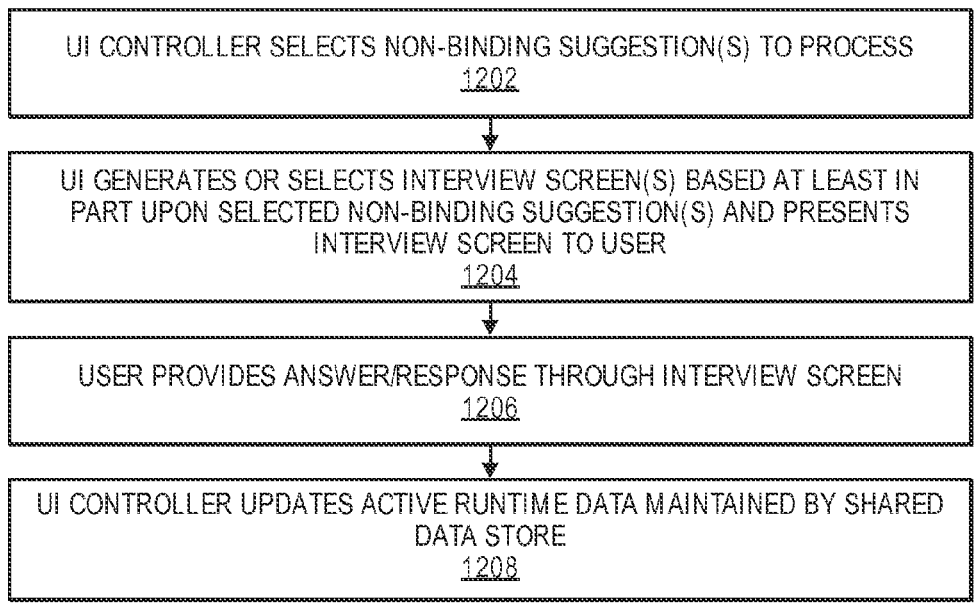
FIG. 12 is a flow diagram further illustrating UI controller processing of non-binding suggestions generated by a tax logic agent and that do not involve electronic tax return data that was the subject of prior confidence analysis.

Referring to FIG. 12, for when non-binding suggestion 411 does not involve a confidence analysis or confidence tag 451t, as discussed above, UI controller 430 selects non-binding suggestion(s) 411, e.g., according to a configuration file 433, and generates or selects interview screen(s) 432 based at least in part upon selected non-binding suggestion(s) 432 and presents interview screen to user. At 1206, the user provides answer/response through interview screen 432, and at 1208, UI controller 430 updates active runtime data 451 maintained by shared data store 440.

Figure 13:
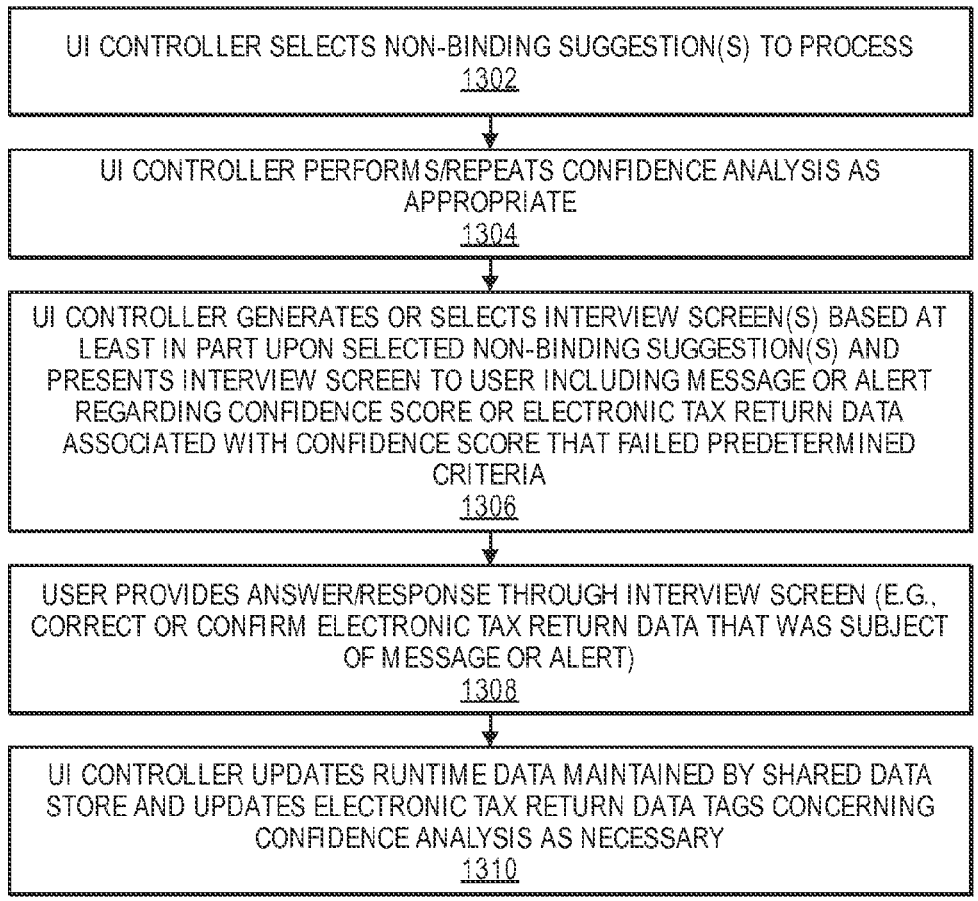
FIG. 13 is a flow diagram further illustrating UI controller processing of non-binding suggestions generated by a tax logic agent and involving electronic tax return data that was the subject of prior confidence analysis.

Referring to FIG. 13, at 1302, UI controller 430 selects non-binding suggestion(s) 411 to process and at 1304, performs/repeats confidence analysis on electronic tax return data 451 identified in a non-binding suggestion as appropriate. At 1306, UI controller 430 generates or selects interview screen(s) 432 based at least in part upon selected non-binding suggestion(s) 411 and presents interview screen 432 to user including message or alert 902 regarding confidence score 421 or electronic tax return data 451 associated with confidence score 451 that failed predetermined criteria. At 1308, user provides an answer or response through an interview screen 432 (e.g., to correct or confirm electronic tax return data 451 that was subject of message or alert 902 or low confidence score), and at 1310, UI controller 430 updates runtime data 451 maintained by shared data store 440 and updates electronic tax return data tags 451t concerning confidence analysis as necessary. The UI controller 420—calculation engine 480—tax logic agent 410 processing is repeated until a state of completion.

While embodiments described above involve determining a confidence score 422 for particular electronic tax return data 451 or a field populated with electronic tax return data 451 and comparing that confidence score 421 with pre-determined criteria, respective confidence scores 422 for respective fields or electronic tax return data 451 can be displayed to provide the user a basis of comparison of different trustworthiness or confidence levels. For example, as generally illustrated in FIG. 14, an interview screen 432 or form or worksheet presented through an interview screen 432 includes seven fields 1102a-g. Five fields 1102a-c and 1102f-g are populated with respective electronic tax return data 451a-c and 451f-g and for which respective confidence scores 422a-c and 422f-g have been determined. In the illustrated example, fields 1402a-c and 1402f-g have been populated with data 451a-c and 451f-g, whereas fields 1402d-e have not been populated. Using the example of pre-determined criteria of a value of at least 0.5, fields 1402a-b and 140f-g or electronic tax return data therein are associated with confidence scores 422 (0.98, 0.95, 0.6 and 0.7) are displayed 1410 adjacent to fields 1102a-b and 1102f-g and satisfy the pre-determined criteria, whereas the confidence score 422 of 0.48 for electronic tax return data 451c in field 1402c does not satisfy the pre-determined criteria. In response, UI controller 430 has added an alert or message 902 concerning this field 1402c for the user's attention, e.g., requesting the user to confirm or correct the low confidence data 451c, and if confirmed, a tag 451t can be added to the data 451c in the shared data store 440 to indicate that the low confidence data has been confirmed, in which case a confirmation may preclude subsequent non-binding suggestions concerning the tag 451t.

Further, while embodiments described above involve determining a confidence score 420 for particular electronic tax return data 451 or a field 1402 populated with electronic tax return data 451 and displaying confidence scores 422 adjacent to respective fields 1402 or data 451, other embodiments may involve respective confidence scores 422 for respective fields 1402 or electronic tax return data 451 being propagated or used to determine confidence scores 422 for other sections of the electronic tax return data 451.

For example, in one embodiment, a confidence score 422 for a tax form or worksheet can be determined based at least in part upon confidence scores 422 of tax return data 451 or fields of the tax form or worksheet. For this purpose, a weight function 426 or algorithm of or used by the confidence analysis module 420 for the tax form or worksheet can be utilized to determine a composite confidence score or confidence score 422 for the tax form or worksheet based at least in part upon respective confidence scores 422 of respective electronic tax return data 451 thereof.

Figure 15:
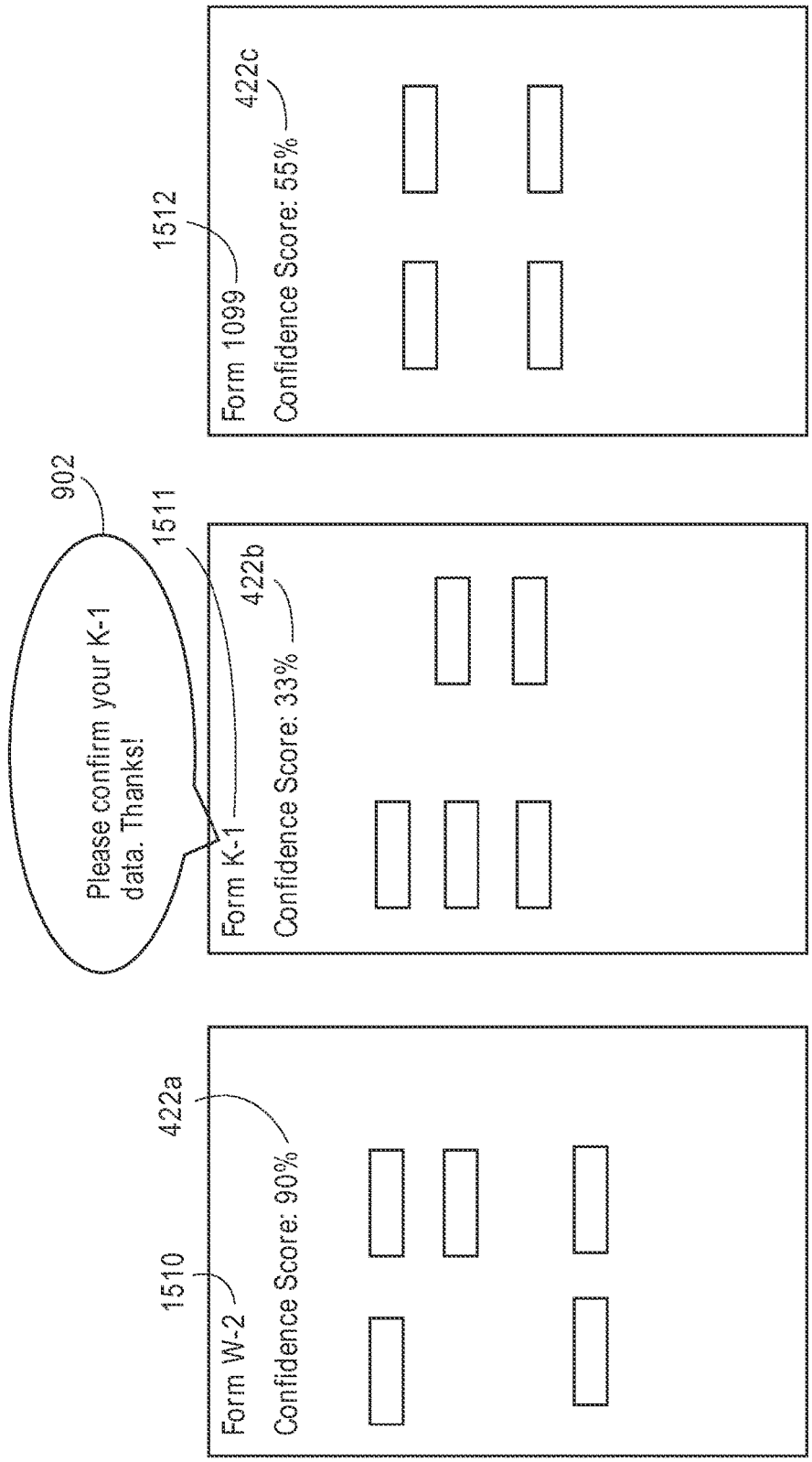
FIG. 15 illustrates one example of how embodiments may be utilized to provide a user of a tax return preparation system with detailed confidence analysis of a specific tax form or worksheet and that is based on confidence scores of electronic tax return data of the tax form or worksheet.

For example, referring to FIG. 15, in one embodiment, a confidence score 422 for a tax form or worksheet can be determined based at least in part upon confidence scores 422 of tax return data or fields of the tax form or worksheet. For this purpose, a weight function 426 or algorithm for the tax form or worksheet can be utilized to determine a composite confidence score or confidence score 422 for the tax form or worksheet (rather than for individual data) based at least in part upon respective confidence scores 422 of respective electronic tax return data 451 of the tax form or worksheet.

For example, FIG. 15 illustrates a confidence scores 422a-c for different forms or worksheets 1510-1512. FIG. 15 shows a determined confidence score 422a of 0.9 for Form W-2 1510, a determined confidence score 422b of 0.55 for Form 1099 1512. Confidence scores 422a-b for these forms or worksheets 1510a-b satisfy the pre-determined criteria of 0.5. However, a confidence score 422c of Form K-1 1511 is a low confidence score of 0.33 to indicate a low confidence or trustworthiness of the data 451 in the Form K-1 1511, in which case the user can be alerted 902 regarding Form K-1 1511, and can drill down to particular electronic tax return data 451 of this form that may be the cause of the low confidence score 422*c*.

Figure 16:
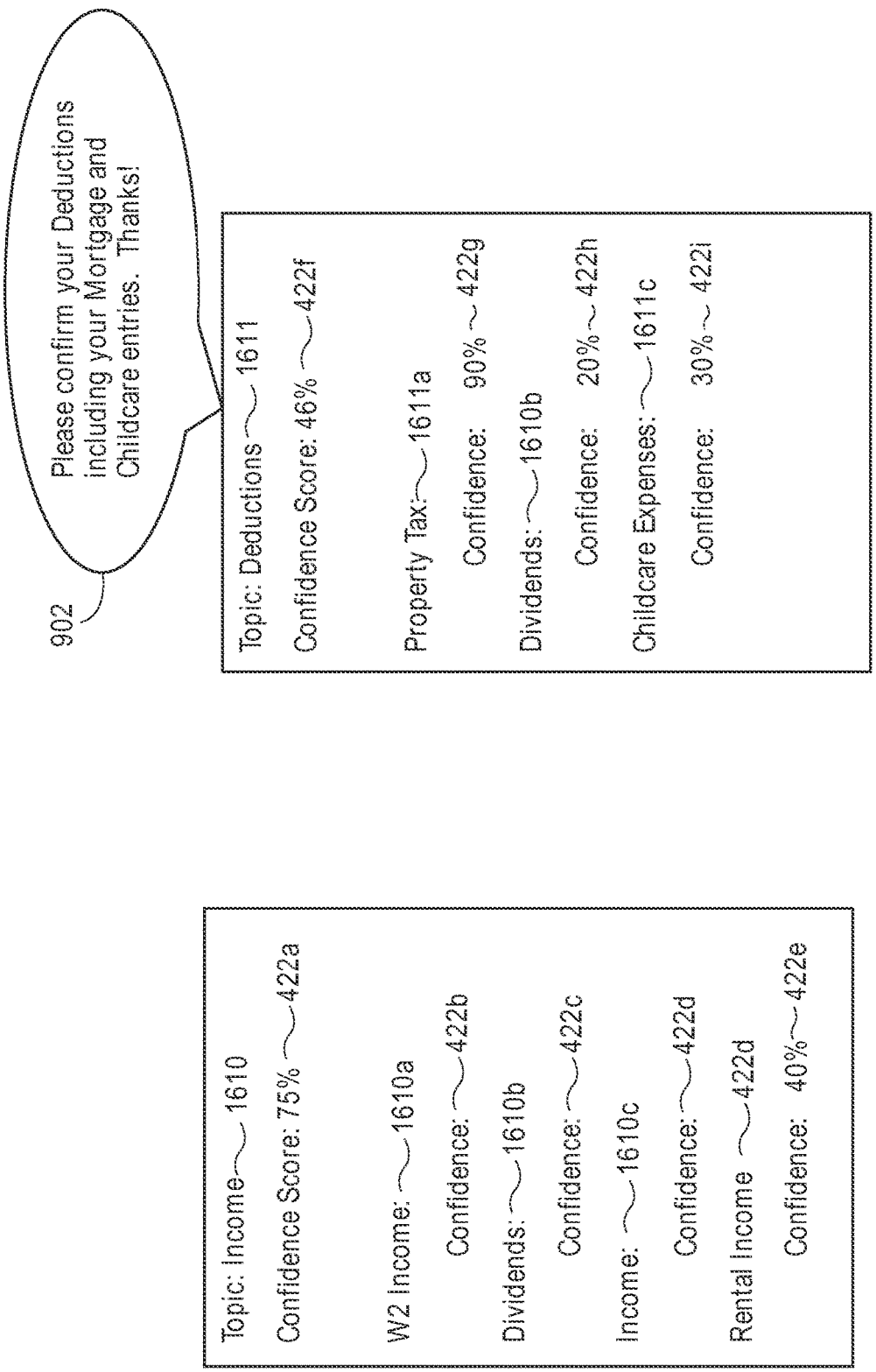
FIG. 16 illustrates one example of how embodiments may be utilized to provide a user of a tax return preparation system with detailed confidence analysis of tax related topics and that is based on confidence scores of electronic tax return data of a topic.

Referring to FIG. 16, in another embodiment, a confidence scores 422*a* and 422*f* for different topics 1610 and 1611 and/or confidence scores 422*b-e* and 422*g-i* for sub-topics 1610*a-d* and 1611*a-c* can be determined based at least in part upon confidence scores 422 of tax return data 451 or fields 1402 of the topic or sub-topic, which may span or involve multiple interview screens 432 or multiple forms or worksheets. For this purpose, a weight function 426 or algorithm of the confidence analysis module 420 for the tax topic can be utilized to determine a composite confidence score or confidence score 422 for the tax topic based at least in part upon respective confidence scores 422 of respective electronic tax return data thereof.

For example, FIG. 16 illustrates a confidence score 422*a* for topic 1610 "Income" (0.75) and confidence scores 422*b-e* for Income sub-topics 1610*a-d* of Form W-2 (0.9), Interest (0.75) and rental income (0.52). FIG. 16 illustrates a further example in which a confidence score 422*f* for topics "Deductions" (0.6) 1611 and confidence scores 422 *f-g* for Deductions sub-topics 1611*a-c* including federal withholdings (0.9), foreign tax paid (0.4) and estimated tax payments (0.25), in which case the user may be alerted 902 regarding low confidence topics of mortgage interest and childcare expenses.

In certain embodiments, an overall confidence score for a form or topic as shown in FIGS. 15-16 that satisfies pre-determined criteria will not cause an alert 902, whereas in other embodiments, an alert or message 902 can be provided for particular topic or form data even when overall confidence score for the topic or form satisfies pre-determined criteria. For example, as shown in FIG. 16, the confidence score 422 for the topic "Income" 1610 is 75% which, continuing with the example involving pre-determined minimum score criteria of 0.5 or 50%, the topic confidence score satisfies the pre-determined criteria such that an alert is not necessary for "Dividends" data 1610*b* of Income that has a confidence score of 20% and "Rental Income" data 1610*d* of Income that has a confidence score of 40%. Thus, embodiments may involve generating an alert or message 902 based only on a confidence score of a topic or form, whereas in other embodiments, individual alerts can be presented for specific topic or form data. Accordingly, it will be understood that FIGS. 15-16 are provided as illustrative examples of how embodiments may be utilize to assess confidence or trustworthiness of topic or form data.

In another embodiment, a confidence score 402 for the electronic tax return as a whole can be determined based at least in part upon confidence scores of topics 1602 and/or confidence scores of forms or worksheets 1502. For this purpose, a weight function 426 or algorithm for the tax topic 1602 can be utilized to determine a composite confidence score 422 for the electronic tax return based at least in part upon respective confidence scores 422 of respective topics 1602 and/or forms or worksheets 1502, which are based at least in part upon respective confidence scores 420 of respective electronic tax return data 451 thereof. Thus, it will be understood that individual tax return or field confidence score determinations can be used for other confidence or trustworthiness assessments for forms or worksheets, a collection of forms or worksheets, topics, a collection of topics, and for the electronic tax return as a whole, e.g., to determine risk of audit based on a comparison of a confidence score of an electronic tax return compared to pre-determined criteria for the electronic tax return as a whole and to alert the user regarding possible audit risks.

Figure 17:
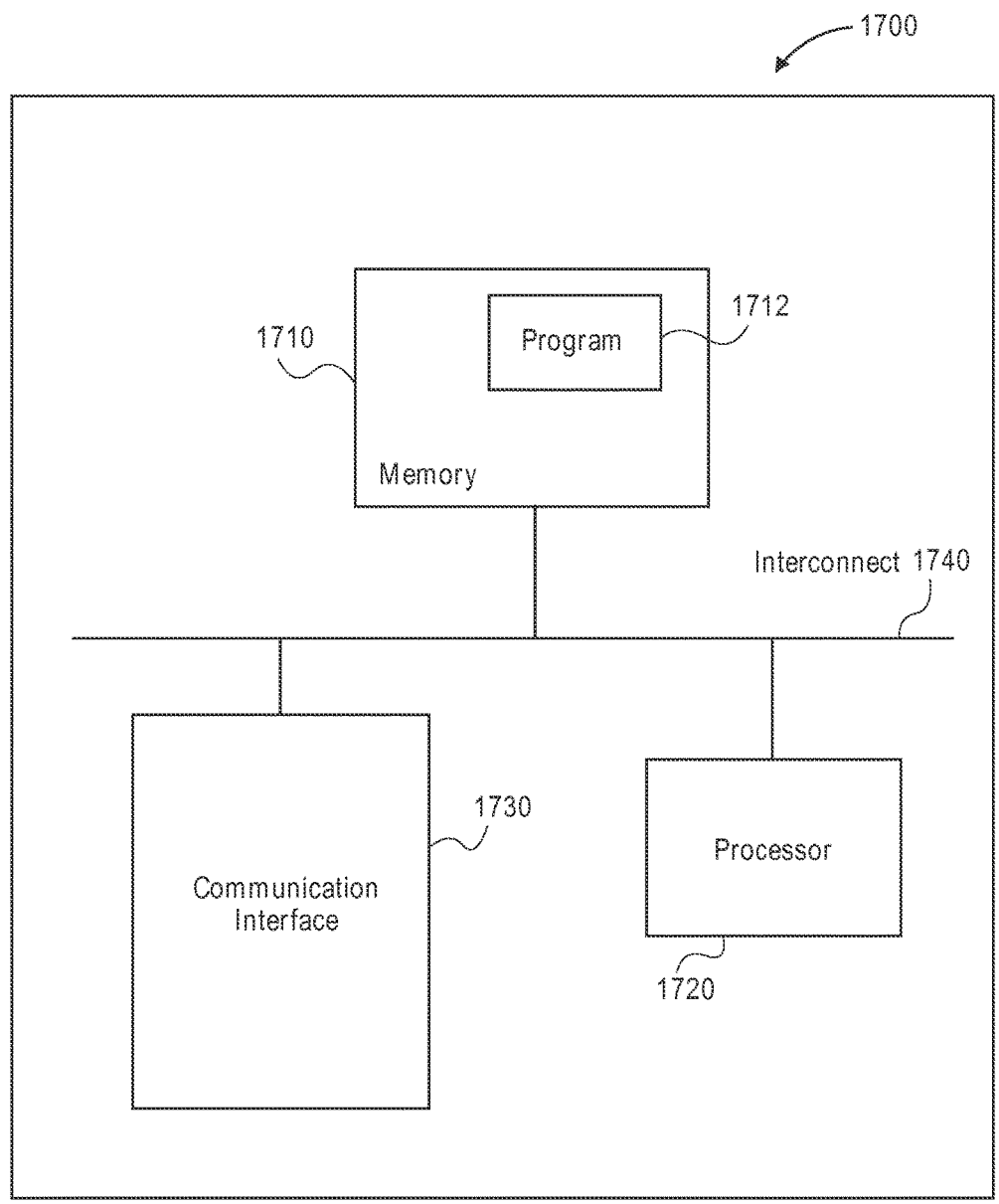
FIG. 17 is a block diagram of components of a computer system that may be programmed or configured to execute embodiments

FIG. 17 generally illustrates certain components of a computing device 1700 that may be utilized to execute or that may embody components of embodiments. For example, the computing device may include a memory 1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A distributed computing system, comprising:
   a first computer comprising a user interface controller;
   a second computer in communication with the first computer through at least one network and comprising a tax logic agent; and
   a third computer in communication through respective networks with respective first and second computers and comprising a data store in communication with the user interface controller and the tax logic agent;
   the user interface controller, being configured or programmed to write electronic tax return data to the data store;
   the tax logic agent, being configured or programmed to
      read runtime electronic tax return data from shared data store, and
      provide a non-binding suggestion to the user interface controller regarding what to present to a user based at least in part upon the runtime electronic tax return data; and
   the user interface controller configured or programmed to
      determine at least one attribute of a source of the electronic tax return data,
      determine a confidence score for the electronic tax return data based at least in part upon at least one source attribute,
      compare the confidence score and pre-determined criteria,
      generate an output indicating whether the confidence score for the electronic tax return data satisfies the pre-determined criteria,
      associate a tag with electronic tax return data that is a subject of the output,
      generate an alert involving the electronic tax return data in response to the confidence score failing to satisfy the predetermined criteria and
      present the alert to the user through a display of a computing device utilized by the user and
      write the electronic tax return data and the tag to the data store so that the tag is associated with the electronic tax return data in the data store.

2. The distributed computing system of claim 1, the tax logic agent comprising or being configured or programmed to generate a non-binding suggestion based at least in part upon the output indicating whether the confidence score for the electronic tax return data satisfies the pre-determined criteria, the user interface controller being configured or programmed to alert the user based at least in part upon the non-binding suggestion.

3. The distributed computing system of claim 2, the user interface controller being configured or programmed to determine the at least one source attribute before the non-binding suggestion is generated.

4. The distributed computing system of claim 1, the user interface controller comprising or being configured or programmed to generate the alert independently of a non-binding suggestion generated by the tax logic agent.

5. The distributed computing system of claim 4, the user interface controller being configured or programmed to determine the at least one source attribute before the electronic tax return data is written to the data store.

6. The distributed computing system of claim 1, the tag indicating whether an associated confidence score satisfied the pre-determined score criteria.

7. The distributed computing system of claim 1, the tag indicating whether electronic tax return data associated with a confidence score that failed to satisfy the pre-determined criteria has been presented to the user.

8. The distributed computing system of claim 1, the tag indicating whether the electronic tax return data associated with the confidence score that failed to satisfy the pre-determined criteria has been confirmed or corrected by the user.

9. The distributed computing system of claim 8, the tag indicating that the user confirmed or corrected electronic tax return data associated with a confidence score that failed to satisfy the pre-determined criteria takes precedence over the output generated by the user interface controller such that no additional alert is generated for that confidence score.

10. The distributed computing system of claim 1, the tag indicating the source attribute.

11. The distributed computing system of claim 1, further comprising a calculation engine configured or programmed to read electronic tax return data from the data store, determine the tag associated with the electronic tax return data, execute a calculation involving the electronic tax return data, determine a calculation result, and write the calculation result to the shared data store together with the associated tag such that the electronic tax return data and the calculation result include the same tag.

12. The distributed computing system of claim 11, wherein the at least one tag indicates that the confidence score for the electronic transaction data did not satisfy the pre-determined criteria, the tax calculation engine being configured to transmit a request to at least one of the tax logic agent and the user interface controller regarding user confirmation or correction of the tagged electronic transaction data before the calculation involving the tagged electronic tax return data is executed.

13. The distributed computing system of claim 11, the tax logic agent being configured or programmed to read runtime data comprising the calculation result and the associated tag from the data store and generate a non-binding suggestion involving the calculation result, the non-binding suggestion identifying or comprising the tag, and provide the non-binding suggestion to the user interface controller.

14. The distributed computing system of claim 1, the user interface controller being configured or programmed to determine multiple attributes of the source, wherein electronic tax return data in the data store includes or is associated with respective tags for respective source attributes.

15. The distributed computing system of claim 1, wherein electronic tax return data in the data store includes or is associated with:
   a first tag indicating the source attribute; and
   a second tag indicating the confidence score for the electronic tax return data or whether the confidence score satisfied the pre-determined criteria.

16. The distributed computing system of claim 15, wherein electronic tax return data in the data store includes or is associated with a third tag indicating whether the user has confirmed or corrected the electronic tax return data that was a subject of the confidence score that failed to satisfy the pre-determined criteria.

17. The distributed computing system of claim 1, the source attribute comprising source identification data, the confidence score for the electronic tax return data being based at least in part upon the source identification data.

18. The distributed computing system of claim 17, the source identification data comprising at least one of a source name and source location data.

19. The distributed computing system of claim 17, the user interface controller being further configured to categorize the source, the attribute comprising a type or category of the source.

20. The distributed computing system of claim 1, the source attribute comprising a format or protocol of electronic data received from the source, the confidence score being for the electronic tax return data based at least in part upon the format or protocol.

21. The distributed computing system of claim 20, the format or protocol comprising at least one of:
an Open Financial Exchange (OFS) data format;
a .tax format; and
a .pdf format.

22. The distributed computing system of claim 20, the format or protocol comprising a format of data generated by an optical character recognition process.

23. The distributed computing system of claim 1, the attribute comprising a score generated by a recognition process, wherein an output generated by the recognition process includes electronic tax data received by the user interface controller, the confidence score for the electronic tax return data being based at least in part upon the recognition process score.

24. The distributed computing system of claim 23, the recognition process comprising optical character recognition (OCR) process, wherein an output generated by the OCR process includes an OCR score, the confidence score being based at least in part upon the OCR score.

25. The distributed computing system of claim 23, the recognition process comprising a speech recognition process, wherein an output generated by the speech recognition process includes a speech recognition score, the confidence score being based at least in part upon the speech recognition score.

26. The distributed computing system of claim 1, the source attribute comprising a communication method utilized to provide the electronic transaction data to the user interface controller, the confidence score for the electronic tax return data being based at least in part upon the communication method.

27. The distributed computing system of claim 26, the communication method comprising electronic transfer of the electronic tax return data from a file locally stored on the user's computer.

28. The distributed computing system of claim 26, the communication method comprising electronic transfer of the electronic tax return data from a source computer through a network.

29. The distributed computing system of claim 26, the communication method comprising manual entry of data by the user via an interview screen presented by the user interface controller.

30. The distributed computing system of claim 1, the user interface controller being configured or programmed to determine at least two attributes of the source of the electronic tax return data, determine a confidence score for the electronic transaction data based at least in part upon the at least two source attributes, perform a comparison of the confidence score for the electronic tax return data and pre-determined criteria, and when the confidence score for the electronic tax return data does not satisfy the pre-determined criteria, generate an output processed by the user interface controller being configured or programmed to process the output to present a screen comprising an alert concerning the electronic tax return data associated with the confidence score for the electronic tax return data that did not satisfy the pre-determined criteria.

31. The distributed computing system of claim 30, the user interface controller being configured to determine the confidence score for the electronic tax return data based at least in part upon a weighting function.

32. The distributed computing system of claim 31, the weighting function inputs comprising at least two source attributes selected from the group consisting of:
identification data of the source of the electronic tax return data;
a format or protocol of the electronic tax return data;
an output generated by the recognition process utilized to determine the electronic tax data; and
a communication method utilized to provide the electronic transaction data to the user interface controller.

33. The distributed computing system of claim 31, the weighting function inputs comprising:
identification data of the source of the electronic tax return data; and
a format or protocol of the electronic tax return data.

34. The distributed computing system of claim 31, the weighting function inputs comprising:
an output or score generated by the recognition process utilized to determine the electronic tax data; and
communication method utilized to provide the electronic transaction data to the user interface controller.

35. The distributed computing system of claim 31, the weighting function inputs comprising:
identification data of the source of the electronic tax return data; and
a communication method utilized to provide the electronic transaction data to the user interface controller.

36. The distributed computing system of claim 1, the user interface controller being further configured or programmed to determine a confidence score for at least a pre-determined section of the electronic tax return based at least in part upon respective confidence scores for respective electronic tax return data, perform a comparison of the confidence score for at least the pre-determined section of the electronic tax return and second pre-determined criteria, and when the confidence score for at least the pre-determined section of the electronic tax return does not satisfy the second pre-determined criteria, generate a second output processed by the user interface controller being configured or programmed to process the second output to present a second screen comprising a second alert concerning the pre-determined section of the electronic tax return associated with the confidence score for pre-determined section of the electronic tax return that did not satisfy the second pre-determined criteria.

37. The distributed computing system of claim 36, the pre-defined section of the electronic tax return comprising a tax form or worksheet, wherein a confidence score for the tax form or worksheet is based at least in part upon respective confidence scores of respective electronic tax return data in the tax form or worksheet.

38. The distributed computing system of claim 36, the pre-defined section of the electronic tax return comprising a tax topic, wherein a confidence score for the tax topic is based at least in part upon respective confidence scores of respective electronic tax return data of the tax topic.

39. The distributed computing system of claim 38, wherein electronic tax return data of the tax topic spans multiple interview screens generated by the user interface controller.

40. The distributed computing system of claim 38, wherein the electronic tax return data of the tax topic spans multiple tax forms or worksheets of the electronic tax return.

41. The distributed computing system of claim 36, the user interface controller being configured to determine a confidence score for the electronic tax return as a whole, wherein the confidence score for the electronic tax return is based at least in part upon respective confidence scores of respective tax forms or worksheets, wherein a confidence score of a tax form or worksheet is based at least in part upon respective confidence scores of respective electronic tax return data of the tax form or worksheet.

42. The distributed computing system of claim 41, the user interface controller being further configured or programmed to generate an output regarding an audit alert when the confidence score for the electronic tax return as a whole does not satisfy pre-determined criteria.

43. The distributed computing system of claim 1, the user interface controller being configured or programmed to update a confidence score as electronic tax return data is received by the user interface controller or the user corrects or confirms the electronic tax return data that has been stored to the data store.

44. The distributed computing system of claim 1, the user interface controller being configured or programmed to determine when to present a screen comprising the alert to the user.

45. The distributed computing system of claim 1, the user interface controller being configured or programmed to present a screen comprising the alert to the user in response to a determination that the confidence score for the electronic tax return data does not satisfy the pre-determined score criteria.

* * * * *